(12) United States Patent
Kayahara et al.

(10) Patent No.: US 12,708,958 B2
(45) Date of Patent: Aug. 18, 2026

(54) WELDING METHOD AND WELDING APPARATUS

(71) Applicant: FURUKAWA ELECTRIC CO., LTD., Tokyo (JP)

(72) Inventors: Takashi Kayahara, Tokyo (JP); Takeshi Tanabe, Tokyo (JP); Tomomichi Yasuoka, Tokyo (JP); Takashi Shigematsu, Tokyo (JP); Tomofumi Sato, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 836 days.

(21) Appl. No.: 17/457,573

(22) Filed: Dec. 3, 2021

(65) Prior Publication Data

US 2022/0088703 A1 Mar. 24, 2022

Related U.S. Application Data

(63) Continuation of application No. PCT/JP2020/022583, filed on Jun. 8, 2020.

(30) Foreign Application Priority Data

Jun. 6, 2019 (JP) ................................ 2019-106558

(51) Int. Cl.
*B23K 26/067* (2006.01)
*B23K 26/064* (2014.01)
(Continued)

(52) U.S. Cl.
CPC .......... *B23K 26/067* (2013.01); *B23K 26/064* (2015.10); *B23K 26/08* (2013.01); *B23K 26/21* (2015.10); *B23K 2103/10* (2018.08)

(58) Field of Classification Search
CPC .. B23K 26/0676; B23K 26/067; B23K 26/21; B23K 26/064; B23K 26/08; B23K 2103/10
See application file for complete search history.

(56) References Cited

U.S. PATENT DOCUMENTS 9,616,522 B2 4/2017 Heinemann et al.
2004/0200813 A1 10/2004 Alips et al.
(Continued)

FOREIGN PATENT DOCUMENTS

CN 102476242 A 5/2012
JP 2010-508149 A 3/2010
(Continued)

OTHER PUBLICATIONS

Extended European Search Report issued on May 12, 2022 in European Patent Application No. 20817769.1, 8 pages.
(Continued)

*Primary Examiner* — Thien S Tran
(74) *Attorney, Agent, or Firm* — Oblon, McClelland, Maier & Neustadt, L.L.P.

(57) ABSTRACT

A welding method includes: placing a workpiece including aluminum in a region to which laser light is emitted; and irradiating the laser light to the workpiece to melt an irradiated portion of the work piece to perform welding. Further, the laser light is formed of a main beam and plural auxiliary beams, and the plural auxiliary beams are positioned so as to surround a periphery of the main beam.

18 Claims, 18 Drawing Sheets

(51) Int. Cl.

| | |
|---|---|
| ***B23K 26/08*** | (2014.01) |
| ***B23K 26/21*** | (2014.01) |
| ***B23K 103/10*** | (2006.01) |

(56) References Cited

U.S. PATENT DOCUMENTS

| | | | | |
|---|---|---|---|---|
| 2010/0044353 | A1 | 2/2010 | Olsen | |
| 2013/0288085 | A1 * | 10/2013 | Morikawa ............. | H01M 4/485 429/59 |
| 2015/0224597 | A1 | 8/2015 | Olsen | |
| 2015/0321286 | A1 | 11/2015 | Heinemann et al. | |
| 2017/0028507 | A1 | 2/2017 | Tsukui | |
| 2017/0182599 | A1 * | 6/2017 | Tsukui ................... | B23K 26/28 |
| 2019/0389001 | A1 | 12/2019 | Yasuoka et al. | |
| 2021/0053152 | A1 * | 2/2021 | Vierstraete ........... | B23K 26/242 |

FOREIGN PATENT DOCUMENTS

| | | | | | |
|---|---|---|---|---|---|
| JP | 2016-173472 | A | | 9/2016 | |
| JP | 2018-51607 | A | | 4/2018 | |
| JP | 2018051607 | A | * | 4/2018 | |
| JP | WO 2018/159857 | A1 | | 9/2018 | |
| WO | WO-2019130043 | A1 | * | 7/2019 | ......... B23K 26/0604 |

OTHER PUBLICATIONS

Combined Chinese Office Action and Search Report issued Apr. 5, 2023 in Patent Application No. 202080040831.5 (with English machine translation and English translation of Category of Cited Documents), 20 pages.

Combined Chinese Office Action and Search Report issued Jan. 13, 2024 in Patent Application No. 202080040831.5 (with English machine translation), 18 pages.

Office Action issued Feb. 28, 2023, in corresponding European Patent Application No. 20 817 769.1, 6 pages.

Japanese Notice of Reasons for Refusal issued Aug. 6, 2024 in Japanese Application No. 2021-524949 with English Machine Translation, 11 pgs.

International Search Report issued Aug. 11, 2020 in PCT/JP2020/022583, filed on Jun. 8, 2020, 2 pages.

* cited by examiner

FIG.5

| OUTPUT (kW) | 8.3 | 16.7 | 33.3 | 50 | 83.3 | 100 | 116.7 | 133 | 150 | 166.7 | 200 | 250 | 300 |
|---|---|---|---|---|---|---|---|---|---|---|---|---|---|
| 12 | | | | | | | | | | | | | |
| 11 | | | | | | | D | A (2) | A (0) | A (9) | B (0) | B (0) | B (0) |
| 10 | | | | | | D (3) | A (2) | A (0) | A (2) | A (9) | B (0) | | |
| 9 | | | | | D (11) | A (1) | A (0) | A (18) | A (17) | B (0) | | | |
| 8 | | | | | A (3) | A (3) | A (3) | A (2) | E | | | | |
| 7 | | | | D (36) | A (15) | E (0) | | | | | | | |
| 6 | | D (34) | C (35) | C (32) | A (17) | E | | | | | | | |
| 5 | C (5) | C (19) | E (19) | E | | | | | | | | | |
| 4 | | | | | | | | | | | | | |
| 3 | | | | | | | | | | | | | |
| 2 | | | | | | | | | | | | | |
| 1 | | | | | | | | | | | | | |

PROCESSING SPEED (mm/sec)

FIG.10

| OUTPUT (kW) \ PROCESSING SPEED (mm/sec) | 8.3 | 16.7 | 33.3 | 50 | 66.7 | 83.3 | 100 | 116.7 | 133 | 150 | 166.7 | 183.3 | 200 | 250 | 300 |
|---|---|---|---|---|---|---|---|---|---|---|---|---|---|---|---|
| 12 | | | | | | | D (1) | A (1) | A (1) | A (3) | A (0) | A (8) | E | | |
| 11 | | | | | | | D (1) | A (0) | A (0) | A (2) | A (18) | E | | | |
| 10 | | | | | | D (4) | A (0) | A (1) | A (3) | A (15) | E | | | | |
| 9 | | | | | | D (6) | A (2) | A (6) | A (13) | E | | | | | |
| 8 | | | | D (13) | A (21) | A (12) | A (14) | A (19) | E | | | | | | |
| 7 | | | D (13) | A (16) | A (20) | A (26) | E | | | | | | | | |
| 6 | | A (25) | A (10) | A (18) | E | | | | | | | | | | |
| 5 | | | | | | | | | | | | | | | |
| 4 | | | | | | | | | | | | | | | |
| 3 | | | | | | | | | | | | | | | |
| 2 | | | | | | | | | | | | | | | |
| 1 | | | | | | | | | | | | | | | |

VERTICAL DIRECTION
P4
P3
P5
P53
T
P51
P52
P1
P2
GAS PHASE
LIQUID PHASE
SOLID PHASE
HORIZONTAL DIRECTION

WELDING METHOD AND WELDING APPARATUS

CROSS-REFERENCE TO RELATED APPLICATION(S)

This application is a continuation of International Application No. PCT/JP2020/022583, filed on Jun. 8, 2020 which claims the benefit of priority of the prior Japanese Patent Application No. 2019-106558, filed on Jun. 6, 2019, the entire contents of which are incorporated herein by reference.

BACKGROUND

The present disclosure relates to welding methods and welding apparatuses.

Laser welding has been known as one of methods of welding workpieces made of metallic materials. Laser welding is a welding method in which a portion to be welded in a workpiece is irradiated with laser light and the portion is melted by energy of the laser light. A liquid pool of the metallic material melted, the liquid pool being called a molten pool, is formed at the portion irradiated with the laser light, and welding is thereafter done by solidification of the molten pool.

Furthermore, in irradiation of a workpiece with laser light, a profile of the laser light may be shaped depending on the purpose. For example, a technique for shaping a profile of laser light when the laser light is used to cut a workpiece has been known (see, for example, Japanese National Publication of International Patent Application No. 2010-508149).

SUMMARY

There is a need for providing a welding method and a welding apparatus that enable reduction in generation of welding defects, such as blowholes, in laser welding of workpieces including aluminum.

According to an embodiment, a welding method includes: placing a workpiece including aluminum in a region to which laser light is emitted; and irradiating the laser light to the workpiece to melt an irradiated portion of the work piece to perform welding. Further, the laser light is formed of a main beam and plural auxiliary beams, and the plural auxiliary beams are positioned so as to surround a periphery of the main beam.

According to an embodiment, a welding method includes irradiating laser light to a workpiece including aluminum to melt an irradiated portion of the workpiece to perform welding. Further, the laser light is formed of a main beam and plural auxiliary beams, the plural auxiliary beams are positioned to surround the periphery of the main beam, and as compared to a case where laser light of a single beam having the total power of the plural auxiliary beams and main beam is emitted: temperature inside a keyhole formed in the workpiece is reduced such that metal vapor of a material forming the workpiece is not generated or generation of the metal vapor is reduced to an acceptable degree; and a melted width is increased.

According to an embodiment, a welding apparatus includes: a laser device; and an optical head configured to emitting laser light output from the laser device to a workpiece including aluminum and melting an irradiated portion of the workpiece to perform welding. Further, the laser light emitted to the workpiece is formed of a main beam and plural auxiliary beams, and the plural auxiliary beams are positioned to surround a periphery of the main beam.

BRIEF DESCRIPTION OF DRAWINGS

FIG. 5 is a diagram illustrating results in a case where a workpiece is lap-welded with the processing speed and output changed (A6061, at a sheet thickness of 2 mm each and a power ratio between the main beam and the auxiliary beams of 1:9);

FIG. 10 is a diagram illustrating results in a case where a workpiece is lap-welded with the processing speed and output changed (A5052, at a sheet thickness of 2 mm each and a power ratio between the main beam and the auxiliary beams of 1:9);

DETAILED DESCRIPTION

In the related art, members including aluminum, for example, members made of high-purity aluminum and members made of aluminum alloy are often used in electrically conductive parts, heat radiating parts, and components for weight reduction, such as parts for vehicles and parts for electrical and electronic devices (members including aluminum may hereinafter be referred to as aluminum members). However, although application of laser welding has received attention for downsizing parts using aluminum members and increasing processing speed, when aluminum members are joined together by common laser welding, welding defects, such as blowholes, may be generated.

Embodiments of the present disclosure will be described in detail below while reference is made to the appended drawings. The present disclosure is not limited by the embodiments described below. Furthermore, the same reference sign will be assigned to elements that are the same or corresponding to each other, as appropriate, throughout the drawings.

First Embodiment

Figure 1:
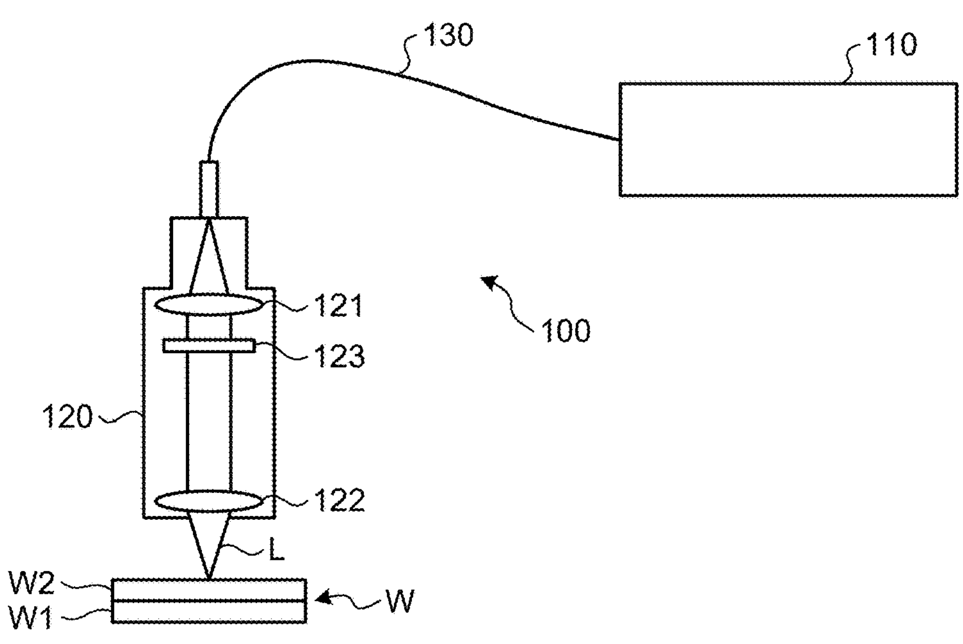
FIG. 1 is a schematic diagram illustrating a schematic configuration of a laser welding apparatus used in a first embodiment.

FIG. 1 is a schematic diagram illustrating a schematic configuration of a laser welding apparatus according to a first embodiment. A laser welding apparatus 100 includes a laser device 110, an optical head 120, and an optical fiber 130 that connects the laser device 110 and the optical head 120 to each other. A workpiece W is formed of two aluminum members W1 and W2 that are sheet-shaped and have been superimposed on each other. Examples of the aluminum members W1 and W2 include: pure aluminum; 2011, 2017, 2024, 2117, and 2219 that are Al—Cu alloys; 3003 that is an Al—Mn alloy; 4032 and 4043 that are Al—Si alloys; 5052 and 5056 that are Al—Mg alloys; 6061 and 6063 that are Al—Mg—Si alloys; Al—Zn—Mg alloys; and 7075 that is an Al—Zn—Mg—Cu alloy. The aluminum members W1 and W2 are each sheet-shaped or plate-shaped and each have a thickness of about 1 mm to 10 mm, for example. The aluminum members W1 and W2 may be made of the same materials or materials different from each other.

The laser device 110 is configured to be capable of outputting laser light having power of, for example, a few kilowatts (kW). For example, the laser device 110 may include plural semiconductor laser elements inside the laser device 110 and be configured to be capable of outputting multi-mode laser light having power of a few kilowatts (kW) as the total output of the plural semiconductor laser elements. Furthermore, the laser device 110 may include any of various laser light sources, such as fiber lasers, YAG lasers, and disk lasers. The optical fiber 130 guides the laser light output from the laser device 110 to input the laser light to the optical head 120.

The optical head 120 is an optical device for emitting the laser light input from the laser device 110, to the workpiece W. The optical head 120 includes a collimator lens 121 and a condenser lens 122. The collimator lens 121 is an optical system for making the input laser light into collimated light. The condenser lens 122 is an optical system for condensing the collimated laser light and emitting the condensed collimated laser light as laser light L, to the workpiece W.

To sweep the workpiece W with the laser light L while irradiating the workpiece W with the laser light L, the optical head 120 is configured such that a position of the optical head 120 is able to be changed relatively to the workpiece W. Examples of a method of changing the relative position to the workpiece W include: moving the optical head 120 itself; and moving the workpiece W. That is, the optical head 120 may be configured to be capable of sweeping, with the laser light L, the workpiece W that has been fixed. Or, a position irradiated with the laser light L from the optical head 120 may be fixed and the workpiece W may be held to be movable relatively to the laser light L that has been fixed.

Figure 2:
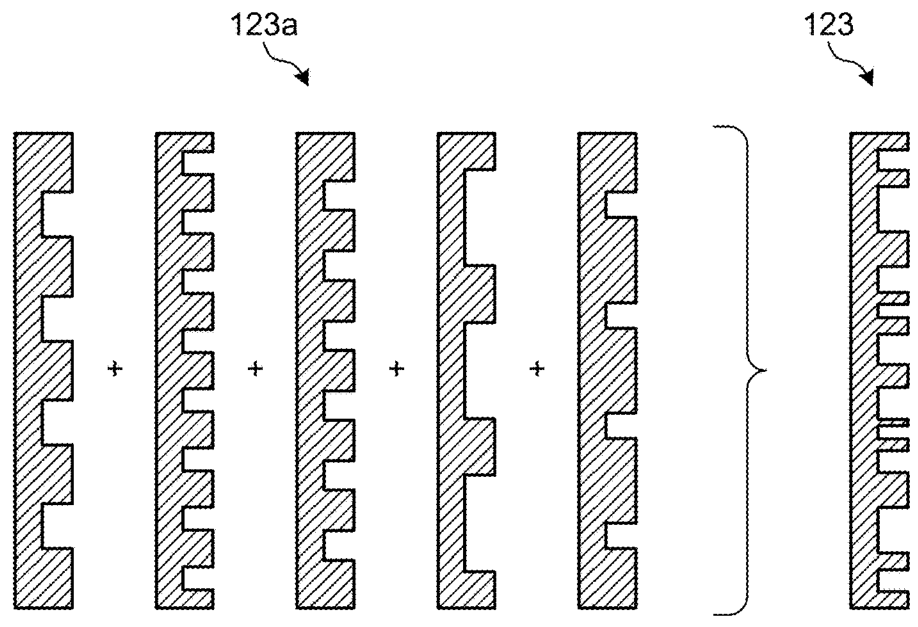
FIG. 2 is a schematic diagram for explanation of a diffractive optical element.

The optical head 120 includes a diffractive optical element 123 that is placed between the collimator lens 121 and the condenser lens 122 and that is an example of a beam shaper. The diffractive optical element 123 referred to herein is also called a DOE (diffractive optical element) and is integrally formed of plural diffraction gratings 123*a* having different periods, as conceptually illustrated in FIG. 2. The diffractive optical element 123 is capable of forming a beam shape by doing one or both of: bending input laser light beams in directions influenced by the respective diffraction gratings; and superimposing the input laser light beams. In this embodiment, the diffractive optical element 123 is placed between the collimator lens 121 and the condenser lens 122 but the diffractive optical element 123 may be provided closer to the optical fiber 130 than the collimator lens 121 is or closer to the workpiece W than the condenser lens 122 is.

The diffractive optical element 123 splits laser light input from the collimator lens 121 into plural beams. Specifically, the diffractive optical element 123 splits the laser light into a main beam and plural auxiliary beams. When this is done, the diffractive optical element 123 splits the laser light such that at least some of the plural auxiliary beams are positioned in front, in a sweep direction, of the main beam.

Figure 3A:
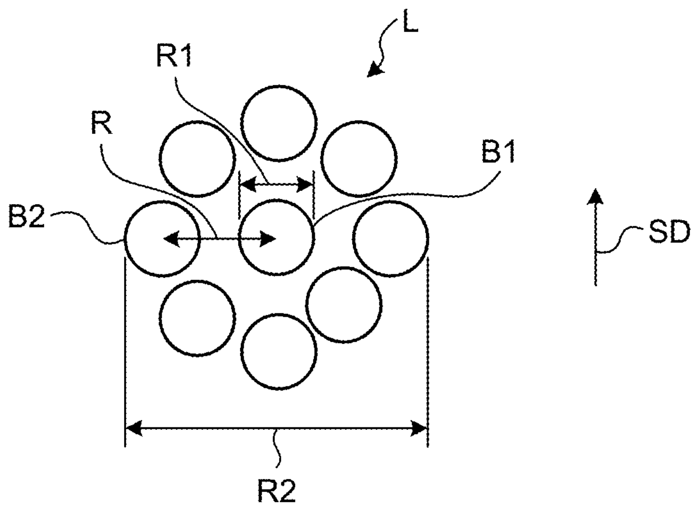
FIG. 3A is a schematic diagram illustrating an example of beam arrangement.
Figure 3B:
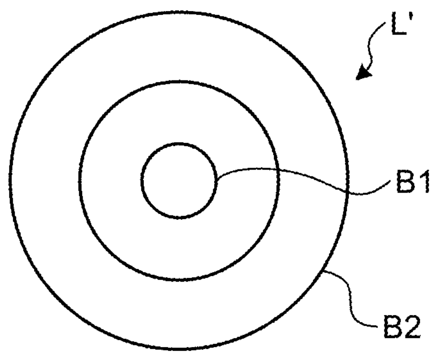
FIG. 3B is a schematic diagram illustrating an example of beam arrangement.

FIG. 3A and FIG. 3B are schematic diagrams illustrating beam arrangements. FIG. 3A and FIG. 3B each illustrate an arrangement of plural beams on a surface of the workpiece W, the surface being a surface that is irradiated with the laser light L. In an example illustrated in FIG. 3A, the laser light L includes a main beam B1 and plural auxiliary beams B2 that have been split by the diffractive optical element 123. In the example illustrated in FIG. 3A, the number of the auxiliary beams B2 is eight. The eight auxiliary beams B2 are positioned to surround the periphery of the main beam B1. Specifically, the eight auxiliary beams B2 are positioned to form an approximate ring shape having a radius R, with the main beam B1 being in the center of the approximate ring shape. Furthermore, like laser light L' illustrated in FIG. 3B, plural auxiliary beams B2 may form a ring shape by overlapping each other continuously.

In the example illustrated in FIG. 3A, three auxiliary beams B2 are positioned in front, in a sweep direction SD, of the main beam B1. Furthermore, two auxiliary beams B2 are positioned laterally, along a direction perpendicular to the sweep direction SD, with respect to the main beam B1. Three auxiliary beams B2 are positioned in back, in the sweep direction SD, of the main beam B1.

Furthermore, each of the main beam B1 and auxiliary beams B2 has, in a radial direction of its beam cross-section, a power distribution having a Gaussian form, for example. However, the power distributions of the main beam B1 and auxiliary beams B2 are not limited to the Gaussian form. Furthermore, in FIG. 3A, diameters of circles depicting the main beam B1 and the auxiliary beams B2 are beam diameters of these beams. A beam diameter of each beam is defined as a diameter of a region including a peak of that beam and having intensity that is $1/e^2$ or more of the intensity of that peak. In this specification, if the beam is not circular, a length of a region having intensity that is $1/e^2$ or more of the peak intensity is defined as the beam diameter, the length being along the direction perpendicular to the sweep direction SD.

The main beam B1 has power smaller than the total power of the auxiliary beams B2. Furthermore, the eight auxiliary beams B2 are equal in power.

A ratio between the power of the main beam B1 and the total power of the eight auxiliary beams B2 is 0:10 to 4:6, and preferably 1:9 to 3:7. If this ratio is 1:9, the ratio between the power of the main beam B1 and the power of one of the auxiliary beams B2 is 1:9/8=8:9. Furthermore, if this ratio is 3:7, the ratio between the power of the main beam B1 and the power of one of the auxiliary beams B2 is 3:7/8=24:7. If the ratio between the power of the main beam B1 and the total power of the eight auxiliary beams B2 is 0:10, the main beam B1 does not exist in FIG. 3A and FIG. 3B.

The power distribution profile of at least the main beam B1 is preferably sharp to some degree. When the power distribution profile of the main beam B1 is sharp to some degree, the depth melted is able to be increased in melting of the workpiece W, and welding strength is thus able to be attained and generation of welding defects is thus able to be reduced more ideally. When a beam diameter is used as an index of sharpness of the main beam B1, the main beam B1 preferably has a beam diameter R1 of 100 μm or more and 500 μm or less, and more preferably, 200 μm or more and 400 μm or less. When the main beam B1 is sharp in form, the power for attaining the same melted depth is able to be reduced and the processing speed therefor is also able to be increased. Therefore, the electric power consumption by the laser welding apparatus 100 is able to be reduced and the processing efficiency is also able to be improved. The power distributions of the auxiliary beams B2 may be as sharp as that of the main beam B1. The beam diameters of the auxiliary beams B2 may be about the same as the beam diameter R1 of the main beam B1. Furthermore, a beam width R2 is 300 μm to 2000 μm, and preferably, 500 μm to 1200 μm. By having the beam width R2 in the above range, a surface area of the molten pool is able to be maintained and the surface of the bead becomes smooth. The beam width R2 is a width formed by the auxiliary beams B2 in the direction orthogonal to the sweep direction SD.

Beam diameters may be designed by appropriately setting specifics of the laser device 110, the optical head 120, and the optical fiber 130 that are used. For example, beam diameters may be set by setting beam diameters of laser light input to the optical head 120 from the optical fiber 130, or setting the optical systems, such as the diffractive optical element 123 and collimator lenses 121 and 122.

When welding is performed using the laser welding apparatus 100, firstly, the workpiece W is placed in a region to which laser light L is emitted. Subsequently, the laser light L and the workpiece W are moved relatively to each other while the workpiece W is irradiated with the laser light L including the main beam B1 and eight auxiliary beams B2 that have been split by the diffractive optical element 123, to perform sweeping with the laser light L and perform welding by melting a portion of the workpiece W, the portion having been irradiated with the laser light L. In FIG. 1, the sweep direction is, for example, the direction pointing out from the plane of the page of the figure or the direction pointing into the page of the figure. The workpiece W is thereby welded.

In this welding, three of the eight auxiliary beams B2 of the laser light L are positioned in front, in the sweep direction SD, of the main beam B1, the ratio between the power of the main beam B1 and the total power of the eight auxiliary beams B2 is 0:10 to 4:6, and generation of welding defects, such as blowholes, is thereby able to be reduced.

Furthermore, in the examples illustrated in FIG. 3A and FIG. 3B, because the eight auxiliary beams B2 of the laser light L are positioned to form an approximate ring shape around the main beam B1, even if the sweep direction is changed to any direction from the sweep direction SD illustrated in FIG. 3A or FIG. 3B, some of the auxiliary beams B2 would be positioned in front, in the sweep direction that has been changed, of the main beam B1. Therefore, the effect of reducing generation of welding defects is able to be achieved for any sweep direction.

Next, as experimental examples, experiments in which workpieces were irradiated with laser light using a laser welding apparatus having the configuration illustrated in FIG. 1 were performed, the workpieces each having sheets that are made of A6061 and that respectively have thicknesses of 2 mm and 1 mm. The wavelength of the laser light output from the laser device was 1070 nm and the power of the laser light was 12 kW. Furthermore, these experiments were performed using and not using a diffractive optical element (DOE).

Figure 4:
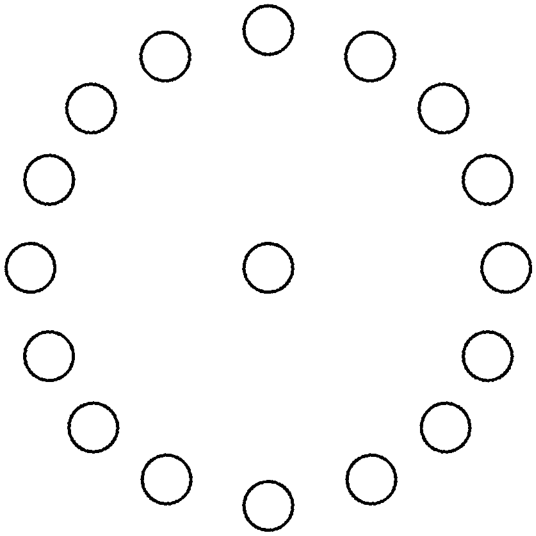
FIG. 4 is a schematic diagram illustrating arrangement of plural beams of laser light in an example.

When using DOEs, seven DOEs that had been designed to split laser light into a main beam and 16 auxiliary beams as illustrated in FIG. 4 were prepared, the 16 auxiliary beams being positioned to form an approximate ring shape with the main beam in the center of the approximate ring shape. A diameter 2R of this ring shape was set to be 921 μm on a surface of the workpiece. The sweep direction was upward in the figure. Furthermore, each DOE was designed such that the 16 auxiliary beams were equal in power. In addition, beam diameters (spot diameters) of the main beam and auxiliary beams were each set to be 267 μm. In lap-welding tests that were conducted: for workpieces W each having aluminum members W1 and W2 having a sheet thickness of 2 mm each, the ratio between the power of the main beam and the total power of the 16 auxiliary beam was 1:9; and for workpieces W each having aluminum members W1 and W2 having a sheet thickness of 1 mm each, the ratios between the power of the main beam and the total power of the 16 auxiliary beams were 1:9 and 3:7. When the ratio between the power of the main beam and the total power of the 16 auxiliary beams is 1:9, the ratio between the power of the main beam and the power of one of the auxiliary beams is 1:9/16=16:9. Furthermore, when the ratio is 3:7, the ratio between the power of the main beam and the power of one of the auxiliary beams is 3:7/16=48:7.

The workpieces W were lap-welded under conditions where the sweep speed of laser light for the workpieces was changed between 8.3 mm/sec to 300 mm/sec and the laser output was changed between 3 kW and 11 kW.

FIG. 5 is a diagram illustrating results in a case where lap welding is performed with the processing speed and output changed (A6061, at a sheet thickness of 2 mm each and a power ratio between the main beam and the auxiliary beams of 1:9). This power ratio (center:periphery) refers to the ratio between the power of the main beam and the total power of the auxiliary beams. Furthermore, the letters, "A", "B", "C", "D", and "E", indicate results of determination of states of irradiated spots (irradiated spot states) by visual inspection, and the numerical values in parentheses indicate the numbers of blowholes generated, the numerical values being from results of observation of the inside of the welds using an X-ray CT device. Specifically, the letter, "A", indicates that the irradiated spot state is satisfactory. The letter, "B", indicates that the irradiated spot state is satisfactory but separation occurred in a driver check. The letter, "C, indicates that the irradiated spot state is satisfactory but many blowholes were generated. The letter, "D", indicates that the bead has penetrated the bottom. The letter, "E", indicates that the sheets were not joined to each other.

As illustrated in FIG. 5, for example, under the conditions where the aluminum members W1 and W2 had a sheet thickness of 2 mm each and the power ratio between the main beam and the auxiliary beams was 1:9, when the sweep speed was 83.3 mm/sec to 300 mm/sec and the laser output was 5 kW to 11 kW, the state of the surface of the bead was satisfactory and generation of blowholes was reduced. According to the results in FIG. 5, even if the processing speed is increased, increasing the laser output enables the state of the surface to be satisfactory and generation of blowholes to be reduced.

Figure 6A:
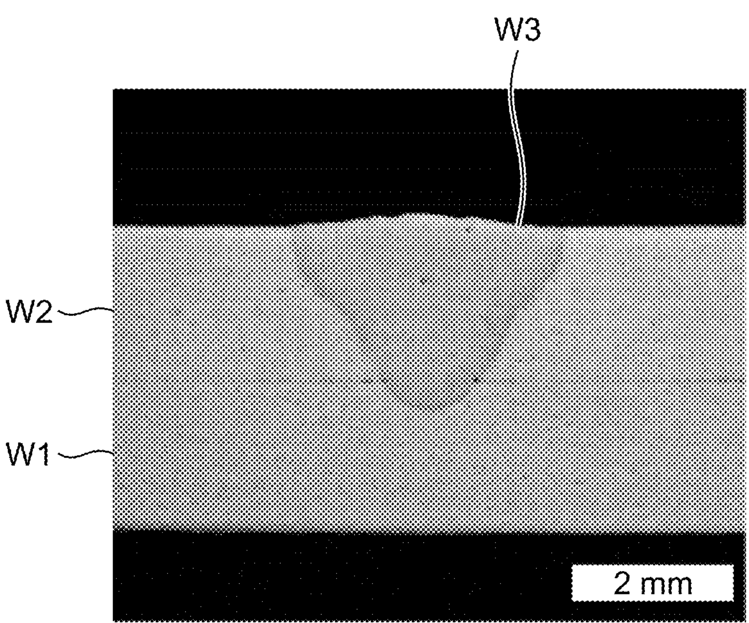
FIG. 6A is a sectional view in a direction orthogonal to an extending direction of a bead in a case where a workpiece is lap-welded at a sheet thickness of 2 mm each and a power ratio between the main beam and the auxiliary beams of 1:9.
Figure 6B:
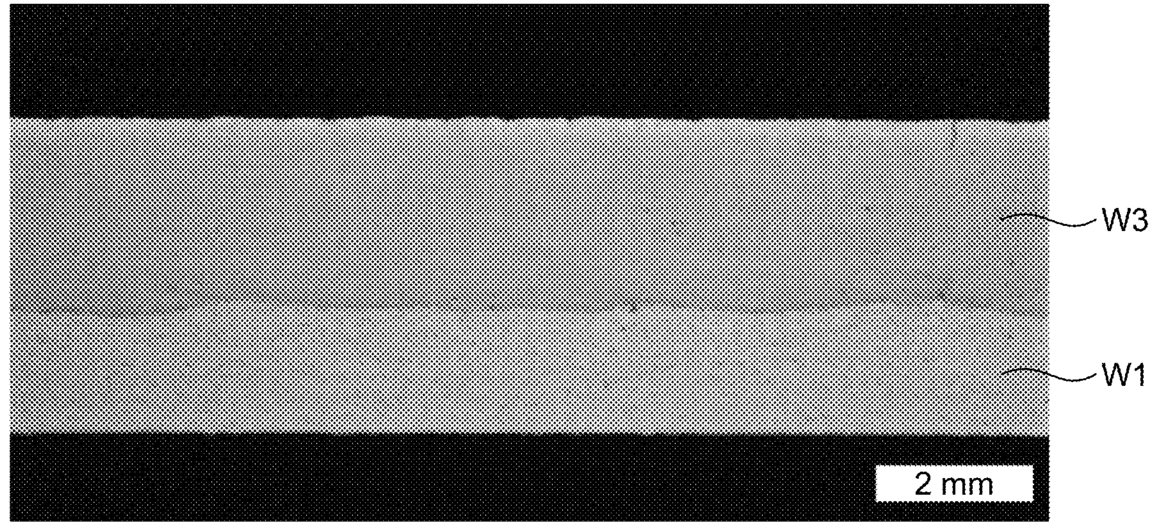
FIG. 6B is a sectional view in a sheet thickness direction parallel to the extending direction of the bead in the case where the workpiece is lap-welded at the sheet thickness of 2 mm each and the power ratio between the main beam and the auxiliary beams of 1:9.
Figure 7A:
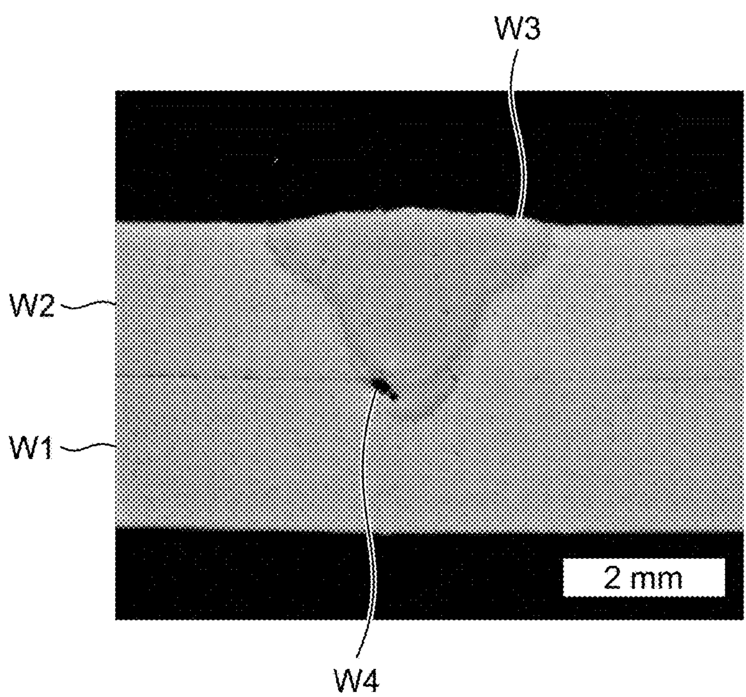
FIG. 7A is a sectional view in a direction orthogonal to an extending direction of a bead in a case where a workpiece having a sheet thickness of 2 mm each is lap-welded under inappropriate conditions.
Figure 7B:
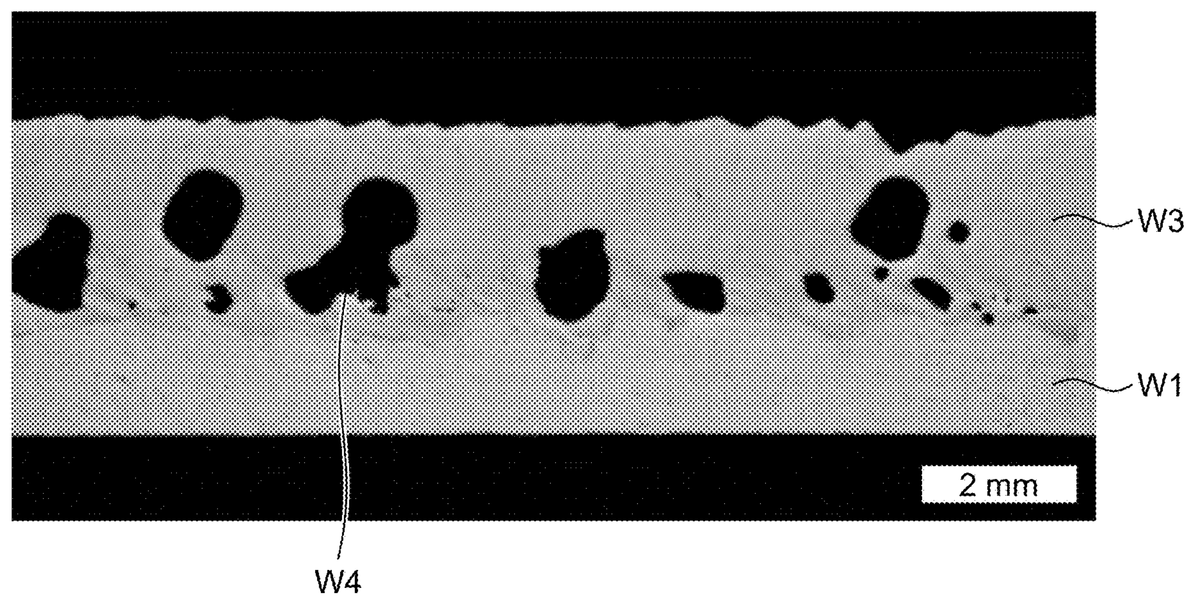
FIG. 7B is a sectional view in a sheet thickness direction parallel to the extending direction of the bead in the case where the workpiece having the sheet thickness of 2 mm each is lap-welded under the inappropriate conditions.

However, under inappropriate conditions, for example, under welding conditions where no DOEs are used or the DOEs are not optimized, as illustrated in FIG. 7A and FIG. 7B, asperity was observed on the surface of the bead and many blowholes were generated. In FIG. 7A and FIG. 7B, W3 is a bead and W4 is a blowhole. FIG. 6A and FIG. 6B where DOEs were used under optimum conditions illustrate that the surface of the bead W3 is smooth and no blowholes W4 are generated as compared to the case where no DOEs are used or the DOEs are not optimized.

By observation of a cross section of the molten pool during welding, it was confirmed that: in the case where DOEs were used under optimum conditions (at the power ratio between the main beam and auxiliary beams of 1:9), generation of gas in the molten pool was not sighted and as a result, there were no blowholes; and in the case where the welding conditions were inappropriate (no DOE were used or the DOEs were not optimized), gas was generated explosively from the front and near the center of the keyhole and the gas did not come out completely during cooling and remained as blowholes. It is presumed that in a case where a workpiece W including aluminum is welded, if the amount of laser irradiation per unit area is too large, gas is generated and remains as blowholes. Therefore, the power ratio between the main beam B1 and each of the auxiliary beams B2 is preferably controlled to be not too large. The power ratio between the main beam B1 and each of the auxiliary beams B2 is preferably about 1:1 to 10:1. When the power ratio between the main beam B1 and the total of the plural auxiliary beams B2 is 0:10, the power ratios between the auxiliary beams B2 are preferably about the same. All of the auxiliary beams may have the same power or one or some of the auxiliary beams may have power larger than the power of the other auxiliary beams, but the power ratio between the main beam having the largest power and the auxiliary beam having the smallest power is preferably controlled to be 10:1 or less.

In the above examples, the main beam B1 and plural auxiliary beams B2 that have been split do not overlap each other, but when the main beam and auxiliary beam, or auxiliary beams are arranged to overlap each other, the amount of laser irradiation for any portion where beams overlap is preferably controlled to be not too large.

Next, workpieces W each having aluminum members W1 and W2 having a sheet thickness of 1 mm each were lap-welded under conditions where the ratio between the power of the main beam and the total power of the 16 auxiliary beams was 1:9 and the sweep speed of the laser light for the workpieces W was changed between 8.3 mm/sec and 200 mm/sec and the laser output was changed between 4 kW and 8 kW.

Figure 8:
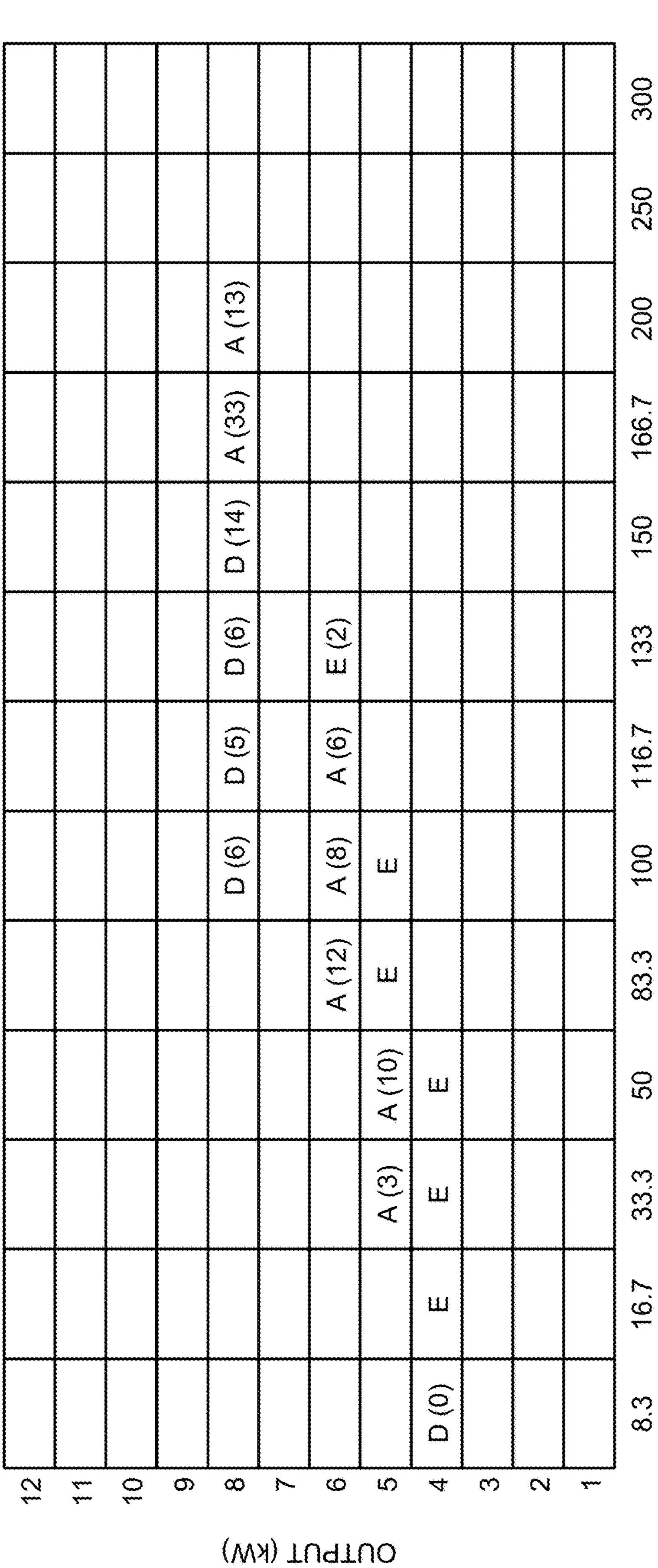
FIG. 8 is a diagram illustrating results in a case where a workpiece is lap-welded with the processing speed and output changed (A6061, at a sheet thickness of 1 mm each and a power ratio between the main beam and the auxiliary beams of 1:9)

FIG. 8 is a diagram illustrating results in a case where lap welding is performed with the processing speed and output changed (A6061, at a sheet thickness of 2 mm each and a power ratio between the main beam and the auxiliary beams of 1:9). As illustrated in FIG. 8, for example, under the conditions where the aluminum members W1 and W2 each had a sheet thickness of 1 mm and the power ratio between the main beam and the auxiliary beams was 1:9, when the sweep speed was 33.3 mm/sec to 200 mm/sec and the laser output was 5 kW to 8 kW, the state of the surface of the bead was satisfactory and generation of blowholes was reduced.

Furthermore, workpieces W each having aluminum members W1 and W2 having a sheet thickness of 1 mm each were lap-welded under conditions where the ratio between the power of the main beam and the total power of the 16 auxiliary beams was 3:7 and the sweep speed of the laser light for the workpieces W was changed between 100 mm/sec and 300 mm/sec and the laser output was changed between 3 kW and 8 kW.

Figure 9:
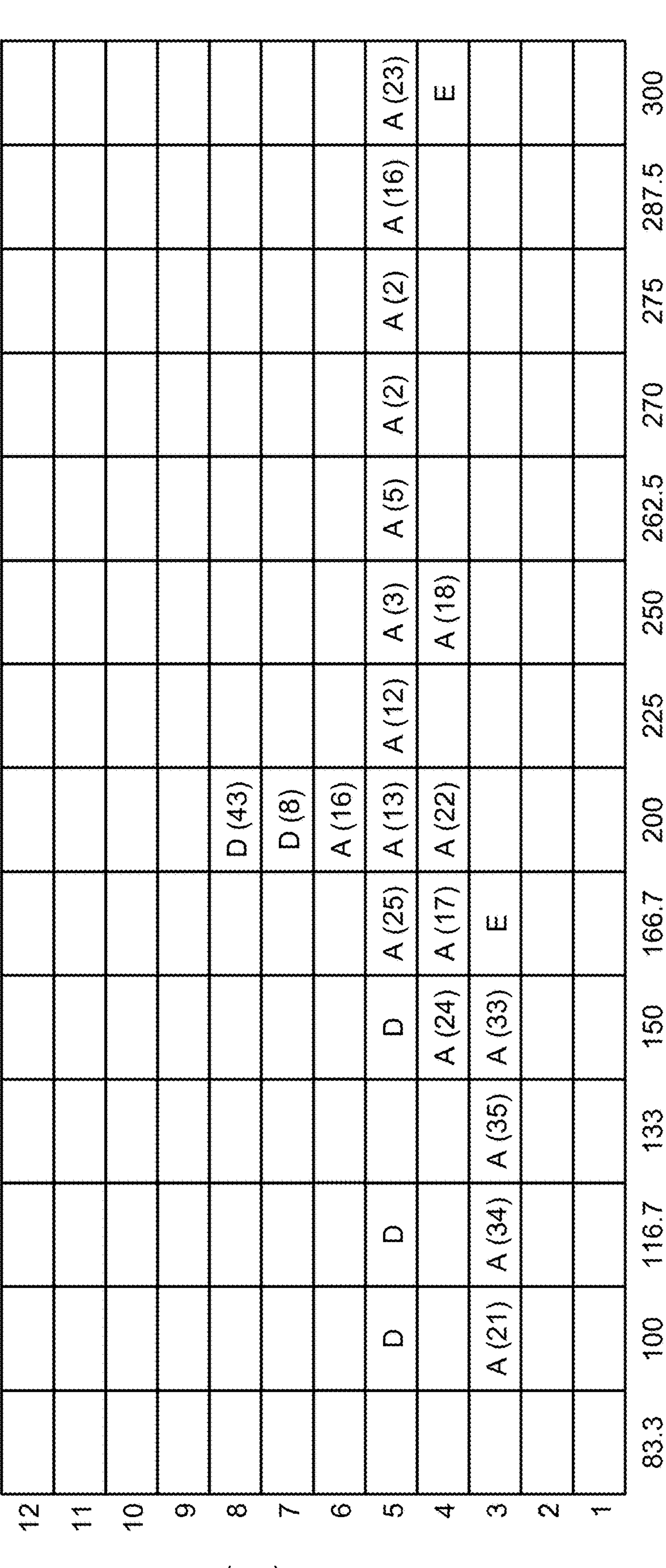
FIG. 9 is a diagram illustrating results in a case where a workpiece is lap-welded with the processing speed and output changed (A6061, at a sheet thickness of 1 mm each and a power ratio between the main beam and the auxiliary beams of 3:7)

FIG. 9 is a diagram illustrating results in a case where lap welding is performed with the processing speed and output changed (A6061, at a sheet thickness of 1 mm each and a power ratio between the main beam and the auxiliary beams of 3:7). As illustrated in FIG. 9, for example, under the conditions where the aluminum members W1 and W2 each had a sheet thickness of 1 mm and the power ratio between the main beam and the auxiliary beams was 3:7, when the sweep speed was 100 mm/sec to 300 mm/sec and the laser output was 4 kW to 6 kW, the state of the surface of the bead was satisfactory and generation of blowholes was reduced.

Next, under the conditions of FIG. 8, workpieces W were lap-welded with the beam diameters (spot diameters) of the main beam and auxiliary beams reduced from 267 μm to 213 μm, and the power density of the main beam and auxiliary beams increased. As a result, for example, under conditions where the laser output was 4 kW and the sweep speed was 16.7 mm/sec to 20 mm/sec, the state of the surface of the bead was satisfactory and generation of blowholes was reduced. Comparison between these results and the results in FIG. 8 indicates that reducing the beam diameters of the main beam and auxiliary beams and increasing the power density tend to shift the conditions enabling ideal welding (the process window) toward lower output for the laser output and toward lower speed for the sweep speed.

Furthermore, experiments were conducted with aluminum members W1 and W2 made of a different material. That is, workpieces W were lap-welded under conditions where the ratio between the power of the main beam and the total power of the 16 auxiliary beams was 1:9, the beam diameters (spot diameters) of the main beam and auxiliary beams were 267 μm, the sweep speed of laser light for the workpieces W was changed between 16.7 mm/sec and 200 mm/sec, and the laser output was changed between 6 kW and 12 kW, the workpieces W each having aluminum members W1 and W2 that are made of A5052 and have a sheet thickness of 2 mm each.

FIG. 10 is a diagram illustrating results in a case where workpieces are lap-welded with the processing speed and output changed (A5052, at a sheet thickness of 2 mm each and a power ratio between the main beam and the auxiliary beams of 1:9). As illustrated in FIG. 10, for example, under the conditions where the aluminum members W1 and W2 each had a sheet thickness of 2 mm and the power ratio between the main beam and the auxiliary beams was 1:9, when the sweep speed was 16.7 mm/sec to 183.3 mm/sec and the laser output was 6 kW to 12 kW, the state of the surface of the bead was satisfactory and generation of blowholes was reduced. In particular, the following conditions are particularly preferable conditions where the number of blowholes is 10 or less.

The laser output is 12 kW and the sweep speed is 116.7 mm/sec to 183.3 mm/sec.

The laser output is 11 kW and the sweep speed is 116.7 mm/sec to 150 mm/sec.

The laser output is 10 kW and the sweep speed is 100 mm/sec to 133 mm/sec.

The laser output is 9 kW and the sweep speed is 100 mm/sec to 116.7 mm/sec.

Furthermore, under the conditions of FIG. 10, workpieces W were lap-welded with sheet thicknesses of their aluminum members W1 and W2 each changed to 1 mm. The power ratio between the main beam and auxiliary beams was changed to 3:7. As a result, for example, the state of the surface of bead was satisfactory and generation of blowholes was reduced under the conditions where: the sweep speed was 150 mm/sec to 225 mm/sec when the laser output was 4 kW; the sweep speed was 150 mm/sec to 275 mm/sec when the laser output was 5 kW; and the sweep speed was 200 mm/sec to 300 mm/sec when the laser output was 6 kW.

Furthermore, under the conditions of FIG. 10, workpieces W were lap-welded, with the sheet thicknesses of the aluminum members W1 and W2 each changed to 1 mm and the beam diameters of the main beam and auxiliary beams changed from 267 km to 213 μm to increase the power density of the main beam and auxiliary beams. The power ratio between the main beam and auxiliary beams was 5:5 or 3:7. As a result, for example, the state of the surface of the bead was satisfactory and generation of blowholes was reduced under the conditions where: the sweep speed was 375 mm/sec to 450 mm/sec when the laser output was 5 kW at the power ratio of 5:5; and the sweep speed was 250 mm/sec to 300 mm/sec when the laser output was 5 kW at the power ratio of 3:7. These results indicate that the ranges of sweep speed that achieve ideal welding differ between the power ratio of 5:5 and the power ratio of 3:7. Furthermore, comparison between the results for the beam diameters of the main beam and auxiliary beams of 267 km and 213 km under the conditions where the sheet thickness was 1 mm each and the power ratio was 3:7 indicates that reducing the beam diameters of the main beam and auxiliary beams to increase the power density tends to shift the conditions enabling ideal welding toward lower output for the laser output and toward higher speed for the sweep speed.

Furthermore, under the conditions of FIG. 10, workpieces W were lap-welded, with the aluminum members W1 each changed to A60601 having a sheet thickness of 2 mm, the aluminum members W1 each being on a side opposite to a side irradiated with laser light. As a result, for example, the state of the surface of the bead was satisfactory and generation of blowholes was reduced under the conditions where: the sweep speed was 100 mm/sec when the laser output was 9 kW; the sweep speed was 116.7 mm/sec when the laser output was 10 kW; and the sweep speed was 133 mm/sec when the laser output was 11 kW. These preferable combinations of laser output and sweep speed were the same even when the positions of the aluminum members W1 and W2 were interchanged. These results indicate that ideal welding is able to be achieved for welding of aluminum members of different kinds.

As described above, irradiating a workpiece W including aluminum, with laser light having a main beam B1 and auxiliary beams arranged to surround the periphery of the main beam B1 such that the power ratio between the main beam and auxiliary beams becomes 0:10 to 4:7 and preferably 1:9 to 3:7 enables welding with reduced generation of blowholes.

Other Examples of Beam Arrangement

In the first embodiment described above, plural auxiliary beams are positioned to surround the periphery of a main beam but the beam arrangement is not limited to this arrangement.

Figure 11:
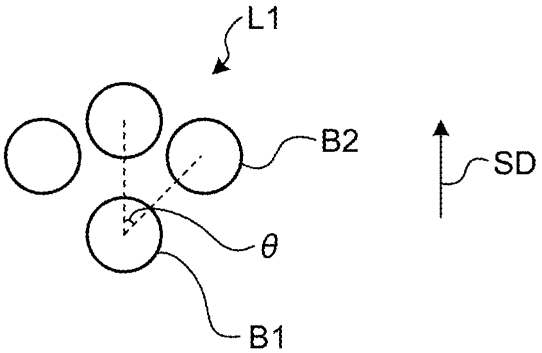
FIG. 11 is a schematic diagram illustrating another example of beam arrangement.

For example, in an example illustrated in FIG. 11, laser light L1 emitted to a workpiece has been split into a main beam B1 and three auxiliary beams B2. All of the three auxiliary beams B2 are positioned in front, in the sweep direction SD, of the main beam B1. The power of the main beam B1 is higher than the power of each of the auxiliary beams B2. Furthermore, the ratio between the power of the main beam B1 and the total power of the three auxiliary beams B2 is 0:10 to 4:6. This arrangement also enables reduction in generation of welding defects, similarly to the first embodiment.

In the forward direction beam arrangement illustrated in FIG. 11, the angle θ formed between lines joining the center of the main beam B1 to the centers of the two auxiliary beams B2 adjacent to each other is preferably 90° or less, more preferably 60° or less, and even more preferably 45° or less.

Furthermore, the shape of the molten pool is preferably nearly line-symmetrical about the sweep direction SD, and thus the three auxiliary beams B2 are also preferably arranged to be line-symmetrical about the sweep direction SD.

As illustrated in FIG. 11, in a case where laser light is split into a main beam B1 and three auxiliary beams B2 by using DOEs, the three auxiliary beams are positioned in front, in the sweep direction, of the main beam, and the ratio between the power of the main beam B1 and the total power of the three auxiliary beams B2 is set to, for example, 1:9; the ratio between the power of the main beam B1 and the power of one of the auxiliary beams becomes 1:9/3=1:3.

Figure 12:
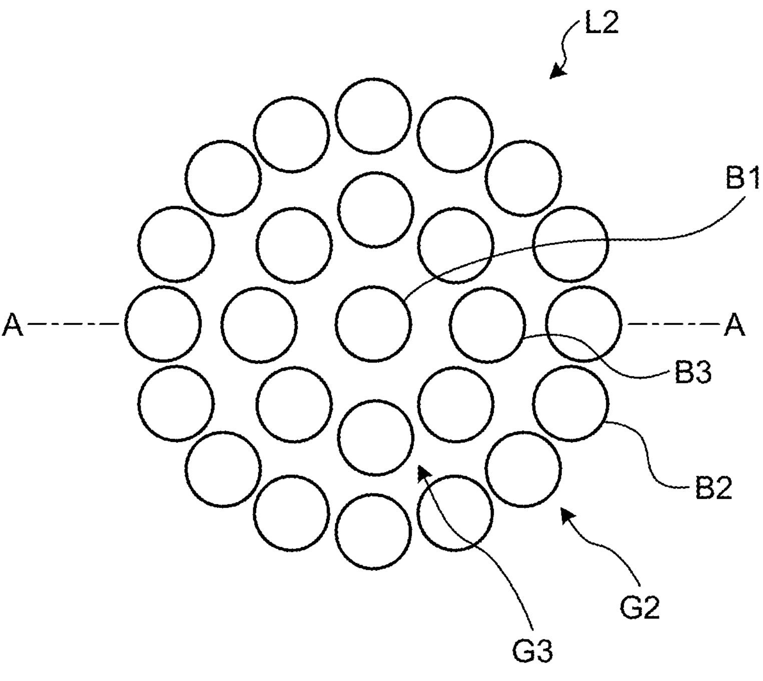
FIG. 12 is a schematic diagram illustrating yet another example of beam arrangement.
Figure 13A:
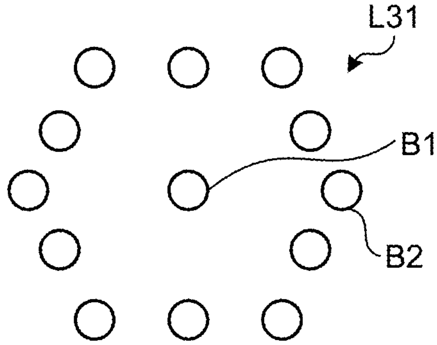
FIG. 13A is a schematic diagram illustrating still another example of beam arrangement.
Figure 13B:
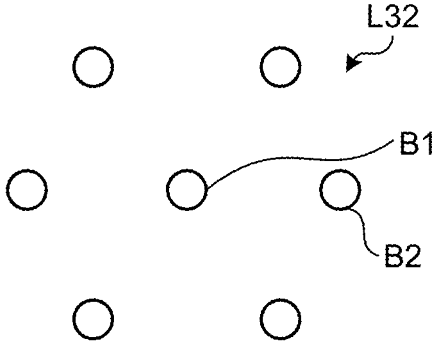
FIG. 13B is a schematic diagram illustrating yet another example of beam arrangement.
Figure 13C:
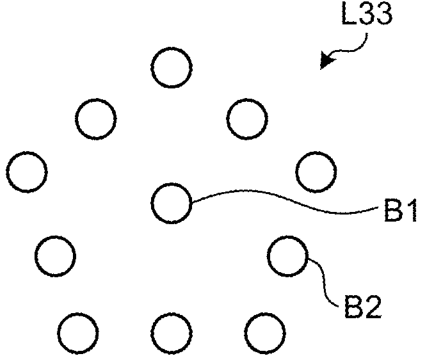
FIG. 13C is a schematic diagram illustrating still another example of beam arrangement.
Figure 13D:
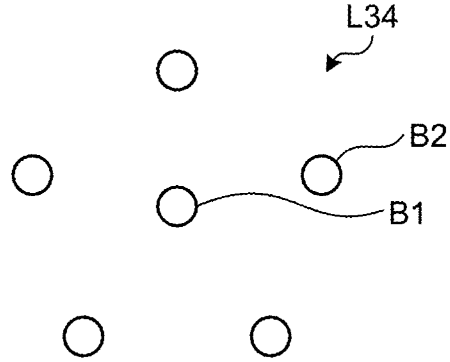
FIG. 13D is a schematic diagram illustrating yet another example of beam arrangement.
Figure 13E:
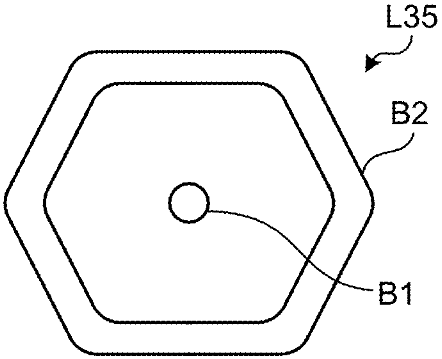
FIG. 13E is a schematic diagram illustrating still another example of beam arrangement.
Figure 13F:
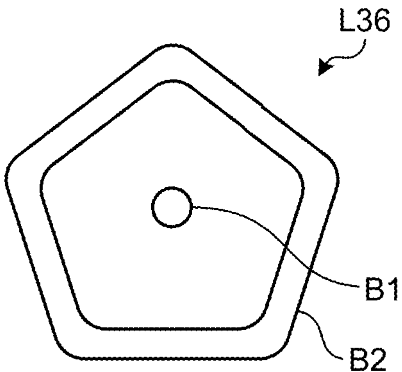
FIG. 13F is a schematic diagram illustrating yet another example of beam arrangement.
Figure 13G:
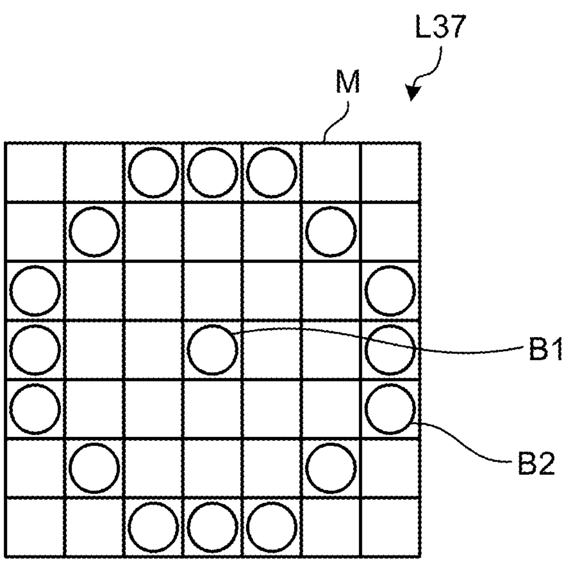
FIG. 13G is a schematic diagram illustrating still another example of beam arrangement.

Furthermore, in an example illustrated in FIG. 12, for example, laser light L2 emitted to a workpiece has been split into a main beam B1, 16 auxiliary beams B2, and eight auxiliary beams B3. The 16 auxiliary beams B2 form an auxiliary beam group G2 and are positioned to form an approximate ring shape with the main beam B1 in the center. The eight auxiliary beams B3 form an auxiliary beam group G3 and are positioned to form an approximate ring shape with the main beam B1 in the center, the approximate ring shape having a diameter smaller than that of the ring shape formed by the auxiliary beams B2. The ratio between the power of the main beam B1 and the total power of the auxiliary beams B2 and auxiliary beams B3 is 0:10 to 4:6. This arrangement also enables reduction in generation of welding defects, similarly to the first embodiment.

FIG. 13A to FIG. 13G are schematic diagrams illustrating yet other examples of beam arrangement. In an example illustrated in FIG. 13A, laser light L31 includes a main beam B1 and twelve auxiliary beams B2. The twelve auxiliary beams B2 are positioned to form an approximate ring shape or an approximate regular hexagonal shape, with the main beam B1 in the center. In an example illustrated in FIG. 13B, laser light L32 includes a main beam B1 and six auxiliary beams B2. The six auxiliary beams B2 are positioned to form an approximate ring shape or hexagonal shape, with the main beam B1 in the center. In an example illustrated in FIG. 13C, laser light L33 includes a main beam B1 and ten auxiliary beams B2. The ten auxiliary beams B2 are positioned to form an approximate ring shape or pentagonal shape, with the main beam B1 in the center. In an example illustrated in FIG. 13D, laser light L34 includes a main beam B1 and five auxiliary beams B2. The five auxiliary beams B2 are positioned to form an approximate ring shape or pentagonal shape, with the main beam B1 in the center. In an example illustrated in FIG. 13E, laser light L35 includes a main beam B1 and plural auxiliary beams B2. The plural auxiliary beams B2 are positioned to overlap each other continuously and to form an approximate ring shape or hexagonal shape, with the main beam B1 in the center. In an example illustrated in FIG. 13F, laser light L36 includes a main beam B1 and plural auxiliary beams B2. The plural auxiliary beams B2 are positioned to overlap each other continuously and to form an approximate ring shape or pentagonal shape, with the main beam B1 in the center. In an example illustrated in FIG. 13G, laser light L37 includes a main beam B1 and 16 auxiliary beams B2. The 16 auxiliary beams B2 are positioned to form an approximate ring shape or an approximate octagonal shape, with the main beam B1 in the center. Furthermore, the main beam B1 and the auxiliary beams B2 are arranged to fill rectangles of a grid defined by a matrix M.

As illustrated in the examples in FIG. 13A to FIG. 13G, a main beam B1 and auxiliary beams B2 may be arranged to fill a grid or arranged more freely. Furthermore, in the examples illustrated in FIG. 13A to FIG. 13G, the sweep directions of the laser light L31 to laser light L37 may be in any direction, and may be in a direction shifted from a diagonal line of the pentagon or hexagon. In addition, the number of auxiliary beams that are not in the front in the sweep direction may be thinned out a little if the auxiliary beams are closely arranged as illustrated in FIG. 13A, FIG. 13C, FIG. 13F, or FIG. 13G.

Second Embodiment

Figure 14:
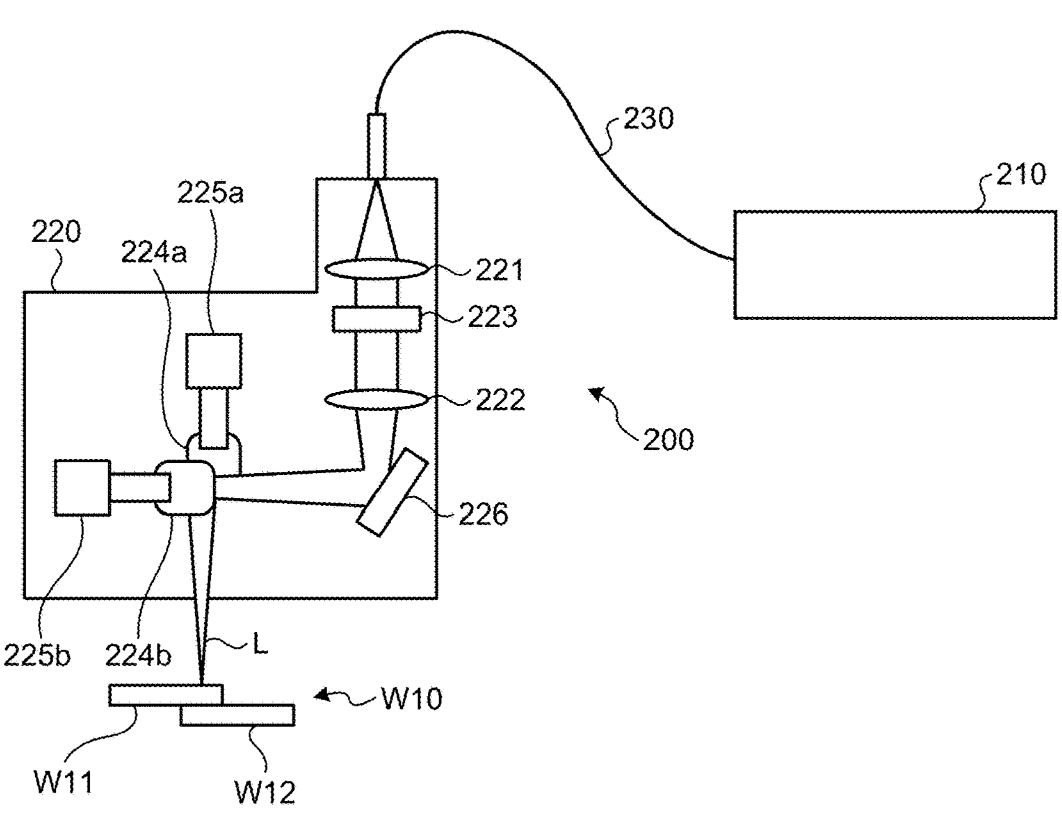
FIG. 14 is a schematic diagram illustrating a schematic configuration of a laser welding apparatus according to a second embodiment.

FIG. 14 is a diagram illustrating a schematic configuration of a laser welding apparatus according to a second embodiment. A laser welding apparatus 200 irradiates a workpiece W10 with laser light L to perform welding of the workpiece W10. The workpiece W10 is formed of two aluminum members W11 and W12 that are sheet-shaped and have been superimposed on each other. The laser welding apparatus 200 implements welding by principles that are similar to those of the laser welding apparatus 100. Therefore, only a device configuration of the laser welding apparatus 200 will be described below.

The laser welding apparatus 200 includes a laser device 210, an optical head 220, and an optical fiber 230.

The laser device 210 is configured similarly to the laser device 110 and is configured to be capable of outputting laser light having power of, for example, a few kilowatts (kW). The optical fiber 230 guides the laser light output from the laser device 210 to input the laser light to the optical head 220.

Similarly to the optical head 120, the optical head 220 is an optical device for emitting the laser light input from the laser device 210, to the workpiece W10. The optical head 220 includes a collimator lens 221 and a condenser lens 222.

Furthermore, the optical head 220 has a galvanoscanner placed between the condenser lens 222 and the workpiece W10. The galvanoscanner is a device that moves the position irradiated with the laser light L to enable sweeping with the laser light L without moving the optical head 220, by controlling the angles of two mirrors 224*a* and 224*b*. The laser welding apparatus 200 includes a mirror 226 for guiding the laser light L emitted from the condenser lens 222, to the galvanoscanner. In addition, the angles of the mirrors 224*a* and 224*b* of the galvanoscanner are changed respectively by motors 225*a* and 225*b*.

The optical head 220 includes a diffractive optical element 223 placed between the collimator lens 221 and the condenser lens 222 and serving as a beam shaper. Similarly to the diffractive optical element 123, the diffractive optical element 223 splits laser light input from the collimator lens 221 into a main beam and plural auxiliary beams. Upon sweeping, at least some of the auxiliary beams are positioned in front, in a sweep direction, of the main beam. The power of the main beam is higher than the power of each of the auxiliary beams and the ratio between the power of the main beam and the total power of the plural auxiliary beams is 0:10 to 4:6. The laser welding apparatus 200 thereby enables reduction in generation of welding defects in welding of the workpiece W10. Similarly to the first embodiment, although the diffractive optical element 223 is placed between the collimator lens 221 and the condenser lens 222, the diffractive optical element 223 may be provided closer to the optical fiber 230 than the collimator lens 221 is or closer to the workpiece W10 than the condenser lens 222 is.

Third Embodiment

Figure 15:
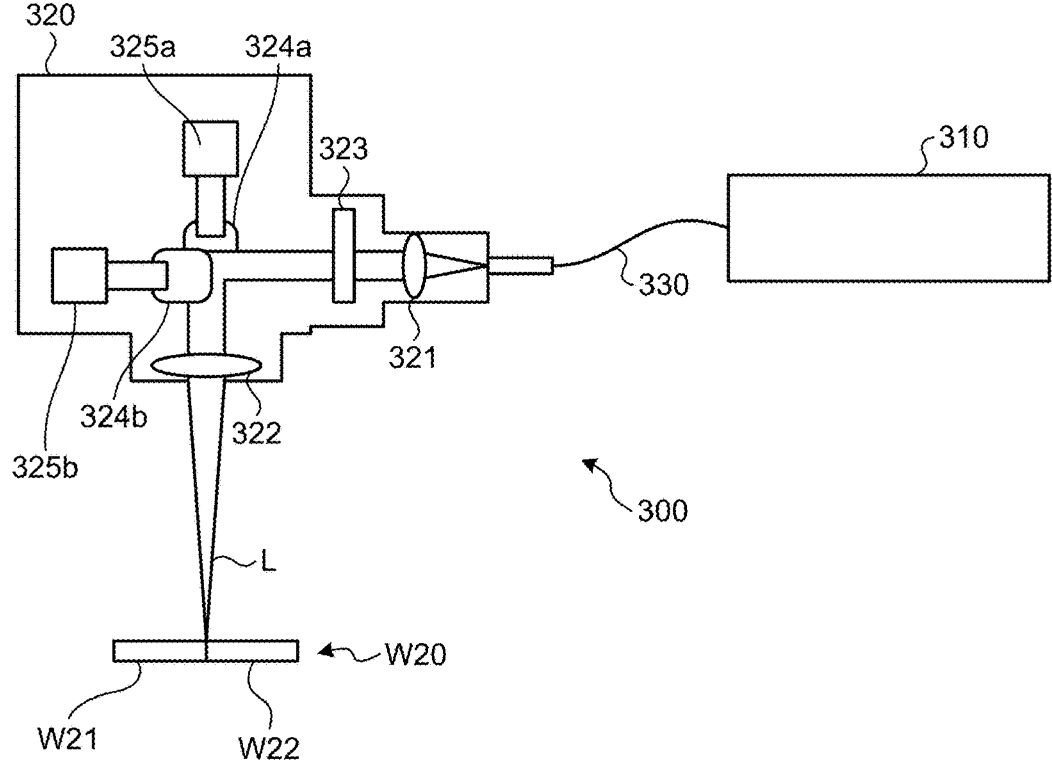
FIG. 15 is a schematic diagram illustrating a schematic configuration of a laser welding apparatus according to a third embodiment.

FIG. 15 is a schematic diagram illustrating a schematic configuration of a laser welding apparatus according to a third embodiment. A laser welding apparatus 300 irradiates a workpiece W20 with laser light L to perform welding of the workpiece W20. The workpiece W20 has two aluminum members W21 and W22 that are sheet-shaped and placed adjacently to butt against each other. The laser welding apparatus 300 implements welding by principles that are similar to those of the laser welding apparatuses 100 and 200. The configurations of elements (a laser device 310 and an optical fiber 330) other than an optical head 320 are similar to the corresponding elements of the laser welding apparatus 100 or 200. Therefore, only a device configuration of the optical head 320 will be described below.

Similarly to the optical heads 120 and 220, the optical head 320 is an optical device for emitting laser light input from the laser device 310, to the workpiece W20. The optical head 320 includes a collimator lens 321 and a condenser lens 322.

Furthermore, the optical head 320 has a galvanoscanner placed between the collimator lens 321 and the condenser lens 322. The angles of mirrors 324*a* and 324*b* of the galvanoscanner are changed respectively by motors 325*a* and 325*b*. In the optical head 320, the galvanoscanner is provided at a position different from that in the optical head 220. However, similarly to the optical head 220, by controlling the angles of the two mirrors 324*a* and 324*b*, the position irradiated with laser light L is moved to enable sweeping with the laser light L, without moving the optical head 320.

The optical head 320 includes a diffractive optical element 323 placed between the collimator lens 321 and the condenser lens 322 and serving as a beam shaper. Similarly to the diffractive optical elements 123 and 223, the diffractive optical element 323 splits laser light input from the collimator lens 321 into a main beam and plural auxiliary beams. Upon sweeping, at least some of the auxiliary beams are positioned in front, in a sweep direction, of the main beam. The power of the main beam is higher than the power of each of the auxiliary beams and the ratio between the power of the main beam and the total power of the plural auxiliary beams is 0:10 to 4:6. The laser welding apparatus 300 thereby enables reduction in generation of welding defects in welding of the workpiece W20. Furthermore, similarly to the first embodiment, although the diffractive optical element 323 is placed between the collimator lens 321 and the condenser lens 322, the diffractive optical element 323 may be provided closer to the optical fiber 330 than the collimator lens 321 is or closer to the workpiece W20 than the condenser lens 322 is.

Fourth Embodiment

Figure 16:
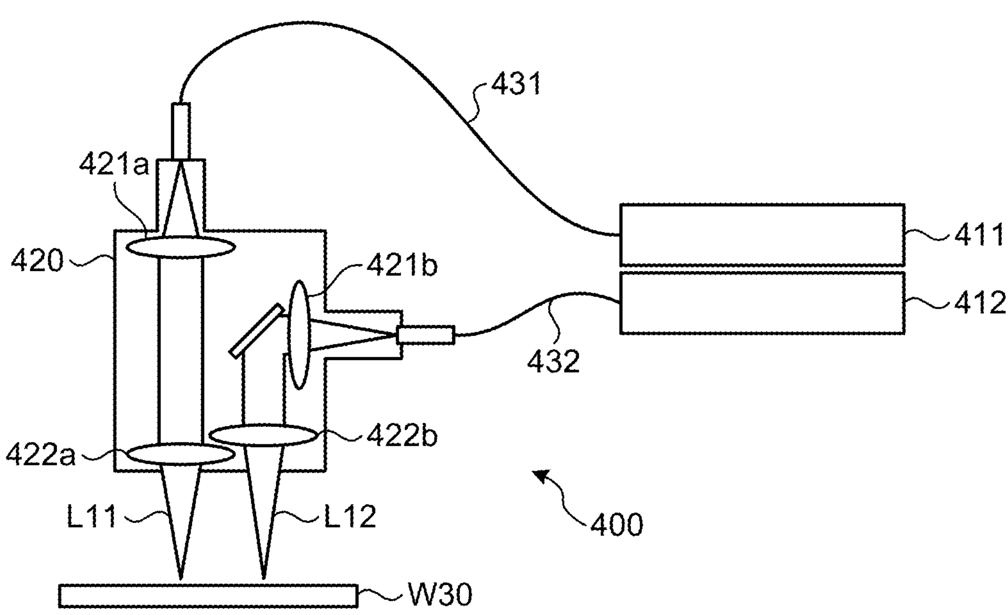
FIG. 16 is a schematic diagram illustrating a schematic configuration of a laser welding apparatus according to a fourth embodiment.

FIG. 16 is a diagram illustrating a schematic configuration of a laser welding apparatus according to a fourth embodiment. A laser welding apparatus 400 irradiates a workpiece W30 with laser light L11 and laser light L12 to perform welding of the workpiece W30. The laser welding apparatus 400 implements a welding method by principles that are similar to those of the laser welding apparatus 100. Therefore, only a device configuration of the laser welding apparatus 400 will be described below.

The laser welding apparatus 400 includes: plural laser devices 411 and 412 that output laser light; an optical head 420 that emits laser light to the workpiece W30; and optical fibers 431 and 432 that guide laser light output from the laser devices 411 and 412 to the optical head 420.

The laser device 411 is configured similarly to the laser device 110 and is configured to be capable of outputting multi-mode laser light L11 having power of a few kilowatts (kW), for example. The laser device 412 is configured similarly to the laser device 110 and is configured to be capable of outputting laser light L12 that is plural multi-mode laser light beams, the laser light L12 having power of a few kilowatts (kW), for example.

The optical fibers 431 and 432 guide the laser light L11 and laser light L12 respectively to the optical head 420. The optical fiber 432 may be formed of plural optical fibers to guide the laser light L12 that is plural laser light beams or may be formed of a multi-core fiber.

The optical head 420 is an optical device for emitting the laser light L11 and the laser light L12 guided respectively from the laser devices 411 and 412, to the workpiece W30. The optical head 420 includes a collimator lens 421*a* and a condenser lens 422*a* that are for the laser light L11 and a collimator lens 421*b* and a condenser lens 422*b* that are for the laser light L12. The collimator lenses 421*a* and 421*b* are optical systems for making the laser light guided by the optical fibers 431 and 432 respectively into collimated light first and the condenser lenses 422*a* and 422*b* are optical systems for condensing the collimated laser light onto the workpiece W30. The collimator lens 421*b* and the condenser lens 422*b* may each be formed of plural lenses for making the laser light L12 that is plural laser light beams into collimated light or for condensing the laser light L12.

As to the laser light L11 and laser light L12, the optical head 420 emits the laser light L11 as a main beam to the workpiece W30 and emits the laser light L12 as auxiliary beams to the workpiece W30. That is, the laser light emitted to the workpiece W30 is formed of the main beam and the plural auxiliary beams. Furthermore, upon sweeping, at least some of the plural auxiliary beams are positioned in front, in a sweep direction, of the main beam. The ratio between the power of the main beam and the total power of the plural auxiliary beams is 0:10 to 4:6. The laser welding apparatus 400 thereby enables reduction in generation of welding defects in welding of the workpiece W30.

The laser welding apparatus 400 enables, for example, the arrangements exemplified by FIG. 3A, FIG. 3B, FIG. 4, FIG. 11, FIG. 12, and FIG. 13A to FIG. 13G. In the example illustrated in the figure, laser light L11 and laser light L12 are used, but the number of laser light beams may be increased or decreased as appropriate.

Fifth Embodiment

Figure 17:
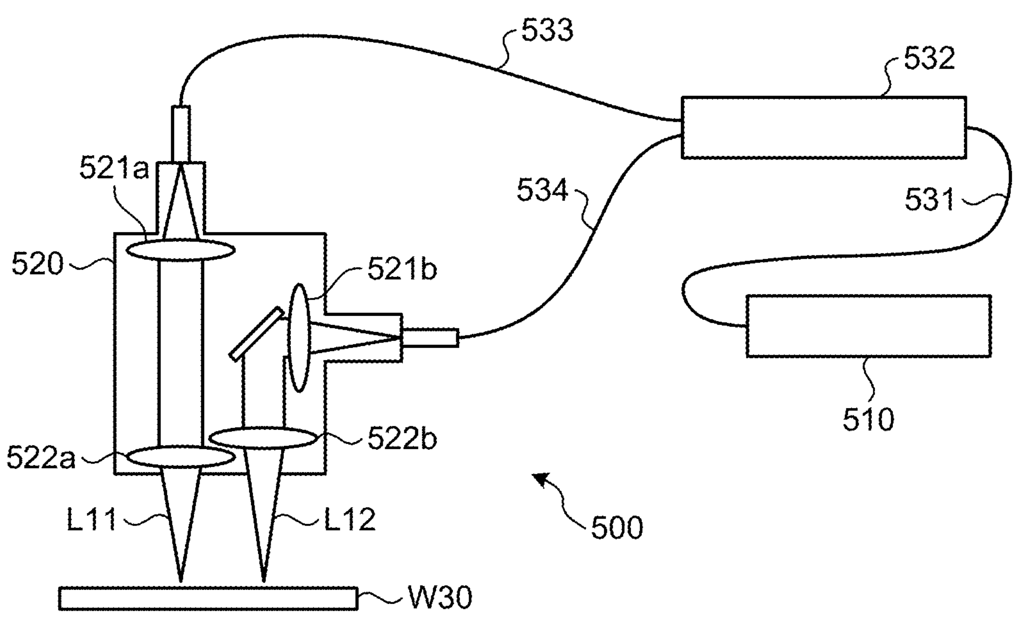
FIG. 17 is a schematic diagram illustrating a schematic configuration of a laser welding apparatus according to a fifth embodiment.

FIG. 17 is a diagram illustrating a schematic configuration of a laser welding apparatus according to a fifth embodiment. A laser welding apparatus 500 irradiates a workpiece W30 with laser light L11 and laser light L12 to perform welding of the workpiece W30. The laser welding apparatus 500 implements a welding method by principles that are similar to those of the laser welding apparatus 100. Therefore, only a device configuration of the laser welding apparatus 500 will be described below.

The laser welding apparatus 500 includes: a laser device 510 that outputs laser light; an optical head 520 that emits laser light to the workpiece W30; and optical fibers 531, 533, and 534 that guide the laser light output from the laser device 510 to the optical head 520.

The laser device 510 is configured similarly to the laser device 110 and is configured to be capable of outputting multi-mode laser light having power of, for example, a few kilowatts (kW). The laser device 510 is used to output both of the laser light L11 and the laser light L12 to be emitted to the workpiece W30. Therefore, a branching unit 532 is provided between the optical fibers 531, and 533 and 534 that guide the laser light output from the laser device 510 to the optical head 520. The laser device 510 is configured to guide the laser light output from the laser device 510 to the optical head 520 after branching the laser light into plural laser light beams.

The optical fibers 533 and 534 guide the laser light L11 and laser light L12 respectively to the optical head 520. The optical fiber 533 may be formed of plural optical fibers to guide the laser light L12 that is plural laser light beams or may be formed of a multi-core fiber.

The optical head 520 is an optical device for emitting the laser light L11 and laser light L12 to the workpiece W30, the laser light L11 and laser light L12 having been branched by the branching unit 532 and guided by the optical fibers 531 and 533. The optical head 520 therefore includes a collimator lens 512*a* and a condenser lens 522*a* that are for the laser light L11 and a collimator lens 521*b* and a condenser lens 522*b* that are for the laser light L12. The collimator lenses 521*a* and 521*b* are optical systems for respectively making the laser light guided by the optical fibers 533 and 534 into collimated light first and the condenser lenses 522*a* and 522*b* are optical systems for condensing the collimated laser light onto the workpiece W30. The collimator lens 521*b* and the condenser lens 522*b* may each be formed of plural lenses for making the laser light L12 that is plural laser light beams into collimated light or for condensing the laser light L12.

As to the laser light L11 and laser light L12, the optical head 520 emits the laser light L11 as a main beam to the workpiece W30 and emits the laser light L12 as auxiliary beams to the workpiece W30. That is, the laser light emitted to the workpiece W30 is formed of the main beam and the plural auxiliary beams. Furthermore, upon sweeping, at least some of the plural auxiliary beams are positioned in front, in a sweep direction, of the main beam. The ratio between the power of the main beam and the total power of the plural auxiliary beams is 0:10 to 4:6. The laser welding apparatus 500 thereby enables reduction in generation of welding defects in welding of the workpiece W30.

The laser welding apparatus 500 enables the arrangements exemplified by FIG. 3A, FIG. 3B, FIG. 4, FIG. 11, FIG. 12, and FIG. 13A to FIG. 13G. In the example illustrated in the figure, laser light L11 and laser light L12 are used, but the number of laser light beams may be increased or decreased as appropriate.

Sixth Embodiment

Figure 18:
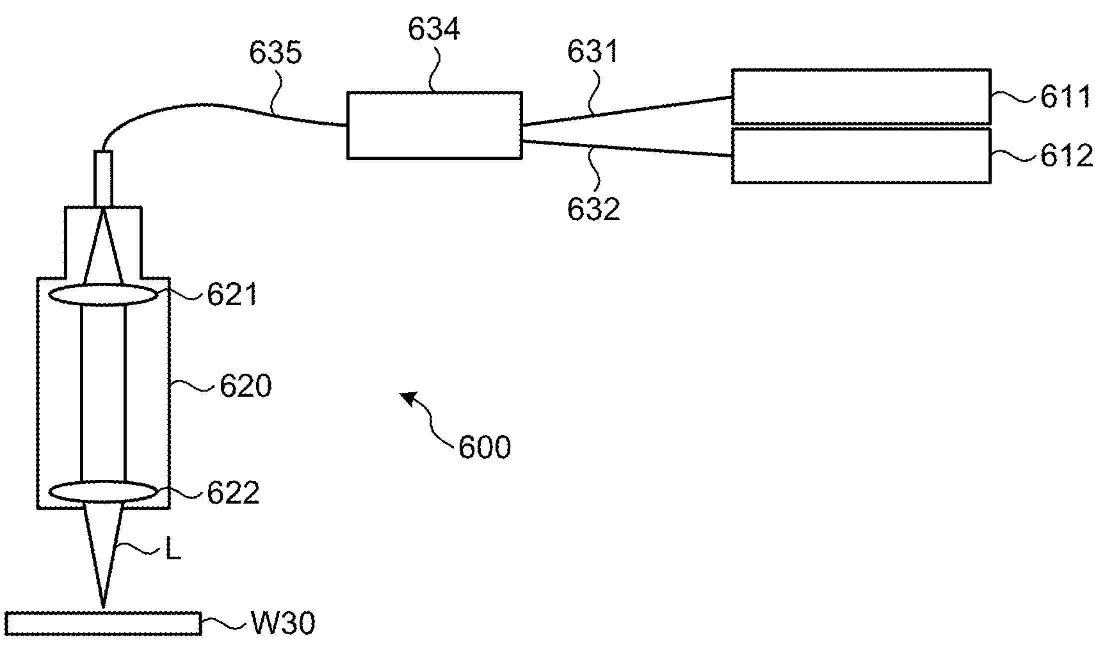
FIG. 18 is a schematic diagram illustrating a schematic configuration of a laser welding apparatus according to a sixth embodiment.

FIG. 18 is a diagram illustrating a schematic configuration of a laser welding apparatus according to a sixth embodiment. A laser welding apparatus 600 irradiates a workpiece W30 with laser light L to perform welding of the workpiece W30. The laser welding apparatus 600 implements a welding method by principles that are similar to those of the laser welding apparatus 100. Therefore, only a device configuration of the laser welding apparatus 600 will be described below.

The laser welding apparatus 600 includes: plural laser devices 611 and 612 that output laser light; an optical head 620 that emits laser light to the workpiece W30; and optical fibers 631, 632, and 635 that guide laser light output from the laser devices 611 and 612 to the optical head 620.

The laser device 611 is configured similarly to the laser device 110 and is configured to be capable of outputting multi-mode laser light having power of, for example, a few kilowatts (kW). The laser device 612 is configured similarly to the laser device 110 and is configured to be capable of outputting plural multi-mode laser light beams having power of a few kilowatts (kW), for example.

Laser light beams output from the laser devices 611 and 612 in the laser welding apparatus 600 are coupled before being guided to the optical head 620. A coupling unit 634 is therefore provided between the optical fibers 631 and 632, and 635 that guide the laser light beams output from the laser devices 611 and 612 to the optical head 620. The laser light beams output from the laser devices 611 and 612 are guided in parallel through the optical fiber 635.

Figure 19A:
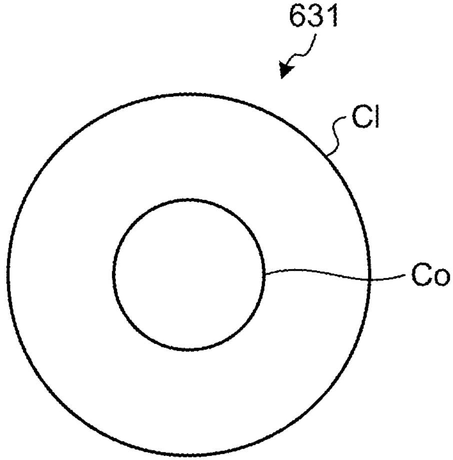
FIG. 19A is a diagram illustrating an example of a configuration of an optical fiber.
Figure 19B:
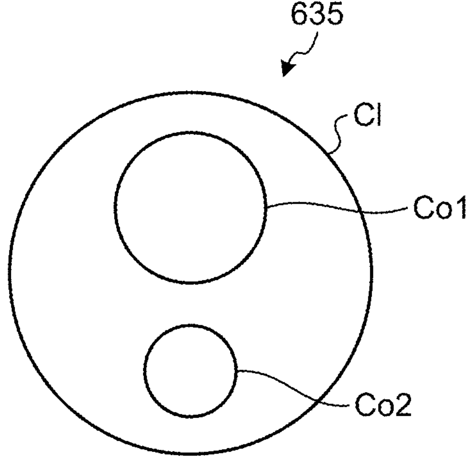
FIG. 19B is a diagram illustrating an example of the configuration of the optical fiber.

An example of configurations of the optical fiber 631 (and the optical fiber 632) and the optical fiber 635 will be described now while reference is made to FIG. 19A and FIG. 19B. As illustrated in FIG. 19A, the optical fiber 631 (and the optical fiber 632) is a normal optical fiber. That is, the optical fiber 631 (and the optical fiber 632) is an optical fiber having a cladding Cl formed around a single core region Co, the cladding C1 having a refractive index lower than that of the core region Co. The optical fiber 635, on the other hand, is a multi-core fiber, as illustrated in FIG. 19B. That is, the optical fiber 635 has two core regions Co1 and Co2 and has a cladding C1 formed around these two core regions Co1 and Co2, the cladding C1 having a refractive index lower than those of the core regions Co1 and Co2. Furthermore, the core region Co2 includes plural core regions. The coupling unit 634 couples the core region Co of the optical fiber 631 and the core region Co1 of the optical fiber 635 to each other, and couples the core region Co of the optical fiber 632 and the core region Co2 of the optical fiber 635 to each other. The plural laser light beams output from the laser device 612 are respectively guided by the plural core regions in the core region Co2.

Reference will now be made to FIG. 18 again. The optical head 620 is an optical device for emitting, to the workpiece W30, laser light L that has been coupled by the coupling unit 634. The optical head 620 therefore includes a collimator lens 621 and a condenser lens 622 inside the optical head 620.

The optical head 620 in the laser welding apparatus 600 does not include a diffractive optical element and does not include independent optical systems for the plural laser light beams either, but the laser light beams output from the laser devices 611 and 612 are coupled before being guided to the optical head 620. The laser light L emitted to the workpiece W30 is thereby formed of a main beam and plural auxiliary beams. Furthermore, when sweeping, at least some of the plural auxiliary beams are positioned in front, in a sweep direction, of the main beam. The ratio between the power of the main beam and the total power of the plural auxiliary beams is 0:10 to 4:6. The laser welding apparatus 600 thereby enables reduction in generation of welding defects in welding of the workpiece W30.

The laser welding apparatus 600 enables the arrangements exemplified by FIG. 3A, FIG. 3B, FIG. 4, FIG. 11, FIG. 12, and FIG. 13A to FIG. 13G. In the example illustrated in the figure, the laser light beams output from the laser devices 611 and 612 are used, but the number of light beams may be increased or decreased as appropriate.

As described above, according to the embodiments of the present disclosure, positioning plural auxiliary beams of laser light to surround the periphery of a main beam enables reduction in generation of welding defects, such as blowholes, upon laser welding of a workpiece including aluminum, such as pure aluminum or aluminum alloy.

Figure 20:
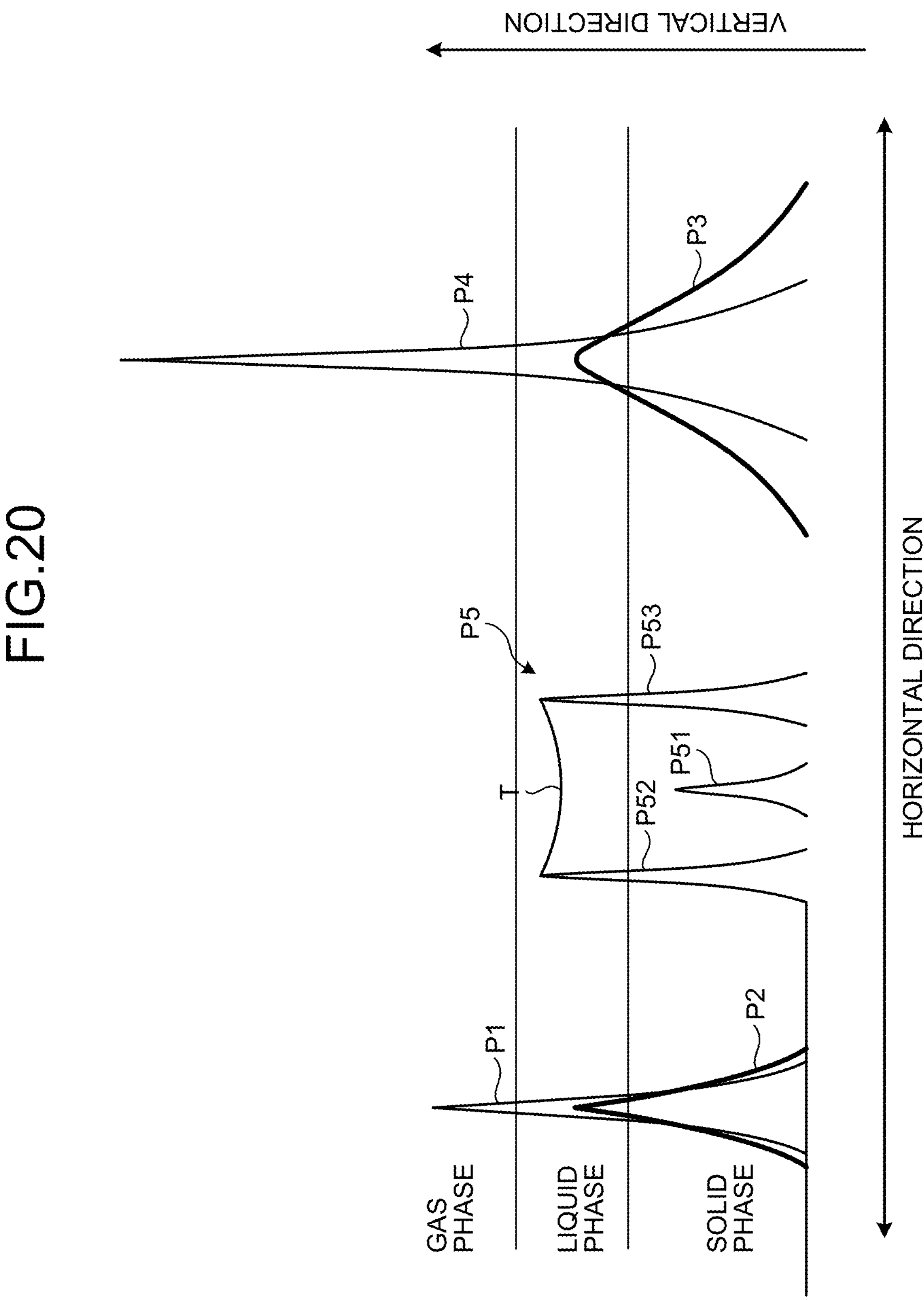
FIG. 20 is a diagram schematically illustrating relations between beam profiles of laser light and states of a workpiece.

FIG. 20 is a diagram schematically illustrating relations between beam profiles of laser light and states of a workpiece. Beam profiles P1, P2, P3, and P4 each represent a case where the laser light is formed of a single beam. A beam profile P5 represents a case where the laser light is formed of a main beam and auxiliary beams. A beam profile P51 is a profile of the main beam, and beam profiles P52 and P53 are beam profiles of two of the auxiliary beams. The horizontal direction in FIG. 20 represents a direction which is orthogonal to the central axis of each beam and along which each beam spreads. For the beam profile P5, the horizontal direction represents a direction in which each of the main beam and the two auxiliary beams positioned to have the main beam between the two auxiliary beams spreads on a plane orthogonal to the central axis of that beam. Furthermore, the vertical direction represents depth from a surface of the workpiece, temperature of the workpiece, or a state of the workpiece, for example.

Blowholes tend to be generated in welding of workpieces including aluminum. Vapor of a component metal generated in a keyhole generated in welding is a cause of generation of blowholes. For example, the beam profile P1 in FIG. 20 corresponds to a case where a beam is focused on the workpiece, but the beam profile P1 has a form corresponding approximately to a temperature distribution in the workpiece. Furthermore, a width of the beam profile P1 at a boundary between the solid phase and the liquid phase corresponds approximately to the melted width. Because a focused single beam has a steep beam profile, FIG. 20 indicates that the temperature of a component metal of a workpiece reaches a temperature at which the component metal changes to a gas phase at the peak power position. In this case, bumping of the component metal occurs and blowholes tend to be generated. In the related art, beams have thus been defocused to increase the beam diameters, decrease the power density, and make the beam profile less steep. Steep temperature distributions generated at spots irradiated with beams are thereby mitigated and generation of blowholes is thus reduced. However, when a beam is defocused, a beam profile like the beam profile P2 is obtained, and although the temperature of the component metal stays in a temperature range where the component metal is in a liquid state even at the peak power, the beam width having the power to change the component metal to the liquid phase is narrower than that in the case where the beam is focused. This means that although the beam diameter is increased by defocusing, the beam width of the portion having the energy actually contributing to the melting of the component metal is not increased, that is, the melted width (the bead width) is not increased. Furthermore, when defocusing, sufficient melted depth may not be obtained and the sweep speed may need to be set lower. That is, generation of blowholes (welding quality) is in a trade-off relation with the melted depth and sweep speed. When the power of a beam is set such that the beam has a beam profile like the beam profile P3 when the beam is defocused to obtain a sufficient melted width by the defocusing, high power is needed upon focusing to obtain a beam profile like the beam profile P4. This means that the defocusing technique has been unable to effectively utilize energy of the beam, and in particular, that the defocusing technique has been unable to effectively utilize energy of a portion at the base of the beam profile.

In contrast, the beam profile P5 includes the beam profile P51 of the main beam and the beam profiles P52 and P53 of the auxiliary beams, the main beam and the auxiliary beams being in a focused state. In this case, as compared to a case where laser light of a single beam having the total power of the main beam and auxiliary beams is emitted in a focused state, reduction of the peak power and reduction in generation of blowholes due to bumping are able to be achieved, and the melted depth and melted width are able to be made comparatively larger. Specifically, a temperature distribution T formed in the workpiece in the case of the beam profile P5 does not have a form that is as steep as a single beam and the width over which the temperature is of the liquid phase is wide. What is more, the steep beam profile in the focused state is utilized, little energy is wasted, the melted depth is able to be made comparatively deep, and the sweep speed is able to be increased. The peak power of the beam profile P51 of the main beam is lower than the peak power of the beam profile P53 or P54 of the auxiliary beams, but because the position of the main beam is thermally influenced by the auxiliary beams around the main beam, the temperature of the workpiece becomes higher than a temperature that is able to be reached by the main beam alone. Therefore, the individual power of each of the main beam and auxiliary beams, and the distance and power ratio between the main beam and the auxiliary beams enable: precise control of the temperature inside the keyhole formed in the workpiece; prevention of generation of metal vapor or reduction of generation of metal vapor to an acceptable degree; and achievement of an appropriate melted region (melted depth and melted width). Such balanced temperature distribution control implements high-quality welding with reduced generation of blowholes. Prevention of generation of metal vapor or reduction of generation of metal vapor to an acceptable degree means that, for example, the number of blowholes becomes the number determined as "A" in the above described experimental examples.

In other words, one embodiment of the present disclosure is a welding method in which: a workpiece including aluminum is irradiated with laser light; an irradiated portion of the workpiece is melted and welded; the laser light is formed of a main beam and plural auxiliary beams; the plural auxiliary beams are positioned to surround the periphery of the main beam; and as compared to a case where the workpiece is irradiated with laser light of a single beam having the total of power of the plural auxiliary beams and main beam, temperature inside a keyhole formed in the workpiece is decreased such that no metal vapor of a material forming the workpiece is generated or the generation of the metal vapor is reduced to an acceptable degree and the melted width is increased. The degree of generation of the metal vapor in the workpiece welded may be confirmed by, for example, the number of blowholes, and the melted width is able to be confirmed by the bead width.

Workpieces are not necessarily sheets or plates, and the welding is not necessarily lap welding nor butt welding. Therefore, a workpiece may be formed by superimposing at least two members to be welded together onto each other, bringing them into contact with each other, or placing them adjacently to each other.

Furthermore, when sweeping a workpiece with laser light, sweeping may be performed by known wobbling or weaving to increase the surface area of the molten pool.

Furthermore, laser light used is not necessarily multimode laser light, and single-mode laser light may also be used.

Furthermore, a workpiece may be a workpiece having a thin metal layer on a surface of aluminum, like a plated aluminum sheet/plate. In addition, although the workpieces described above as examples each have a thickness of about 1 mm to 10 mm, the workpiece may have a thinner thickness of about 0.01 mm.

Furthermore, the present disclosure is not to be limited by the embodiments described above. The present disclosure also includes those formed by combining components of the embodiments as appropriate. Further effects and modifications will readily occur to those skilled in the art. Therefore, wider aspects of the present disclosure are not limited to the embodiments described above, and various modifications can be made.

INDUSTRIAL APPLICABILITY

The present disclosure is suitably applied to welding of a workpiece including aluminum.

According to an embodiment, it is possible to obtain an effect of enabling reduction in generation of welding defects, such as blowholes, in laser welding of workpieces including aluminum.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A welding method comprising:

placing a workpiece including aluminum in a region to which laser light is emitted; and irradiating the laser light to the workpiece to melt an irradiated portion of the work piece to perform welding, wherein the laser light is formed of a main beam and a plurality of auxiliary beams, the plurality of auxiliary beams are positioned to overlap each other continuously so as to form a single ring shape with the main beam as a center of the single ring shape, a ratio between power of the main beam and a total power of the plurality of auxiliary beams is 1:9 to 3:7, a sweep speed of the laser light is 16.7 mm/sec to 300 mm/sec, and the main beam and the plurality of auxiliary beams are generated with a laser output of 4 kW to 12 kW.

2. The welding method according to claim 1, wherein the laser light and the workpiece are moved relatively to each other so that the laser light sweeps the workpiece to perform welding by melting.

3. The welding method according to claim 1, wherein the workpiece includes at least two members to be welded together, and when the workpiece is placed in the region to which the laser light is emitted, the at least two members are superimposed onto each other, brought into contact with each other, or placed adjacently to each other.

4. The welding method according to claim 1, wherein the laser light is split into the main beam and the plurality of auxiliary beams by a beam shaper and emitted to the workpiece.

5. The welding method according to claim 4, wherein the beam shaper is a diffractive optical element.

6. The welding method according to claim 1, wherein the workpiece is pure aluminum, an aluminum-copper alloy, an aluminum-manganese alloy, an aluminum-silicon alloy, an aluminum-magnesium alloy, an aluminum-magnesium-silicon alloy, an aluminum-zinc-magnesium alloy, or an aluminum-zinc-magnesium-copper alloy.

7. A welding apparatus, comprising:

a laser device; and an optical head configured to emitting laser light output from the laser device to a workpiece including aluminum and melting an irradiated portion of the workpiece to perform welding, wherein the laser light emitted to the workpiece is formed of a main beam and a plurality of auxiliary beams, the plurality of auxiliary beams are positioned to overlap each other continuously so as to form a single ring shape with the main beam as a center of the single ring shape, a ratio between power of the main beam and a total power of the plurality of auxiliary beams is 1:9 to 3:7, a sweep speed of the laser light is 16.7 mm/sec to 300 mm/sec, and the main beam and the plurality of auxiliary beams are generated with a laser output of 4 kW to 12 kW.

8. The welding apparatus according to claim 7, wherein the optical head is configured to enable the laser light and the workpiece to move relatively to each other, sweeps the workpiece with the laser light, and perform welding by the melting.

9. The welding apparatus according to claim 7, comprising a beam shaper that splits the laser light into the main beam and the plurality of auxiliary beams.

10. The welding apparatus according to claim 9, wherein the beam shaper is a diffractive optical element.

11. The welding method according to claim 1, wherein the ratio between the power of the main beam and the total power of the plurality of auxiliary beams is 1:9, the sweep speed of the laser light is 83.3 mm/sec to 300 mm/sec, and the main beam and the plurality of auxiliary beams are generated with the laser output of 5 kW to 11 kW.

12. The welding method according to claim 1, wherein the ratio between the power of the main beam and the total power of the plurality of auxiliary beams is 1:9, the sweep speed of the laser light is 33.3 mm/sec to 200 mm/sec, and the main beam and the plurality of auxiliary beams are generated with the laser output of 5 kW to 8 kW.

13. The welding method according to claim 1, wherein the ratio between the power of the main beam and the total power of the plurality of auxiliary beams is 3:7, the sweep speed of the laser light is 100 mm/sec to 300 mm/sec, and the main beam and the plurality of auxiliary beams are generated with the laser output of 4 kW to 6 kW.

14. The welding method according to claim 1, wherein the ratio between the power of the main beam and the total power of the plurality of auxiliary beams is 1:9, the sweep speed of the laser light is 16.7 mm/sec to 183.3 mm/sec, and the main beam and the plurality of auxiliary beams are generated with the laser output of 6 kW to 12 kW.

15. The welding apparatus according to claim 7, wherein the ratio between the power of the main beam and the total power of the plurality of auxiliary beams is 1:9, the sweep speed of the laser light is 83.3 mm/sec to 300 mm/sec, and the main beam and the plurality of auxiliary beams are generated with the laser output of 5 kW to 11 kW.

16. The welding apparatus according to claim 7, wherein the ratio between the power of the main beam and the total power of the plurality of auxiliary beams is 1:9, the sweep speed of the laser light is 33.3 mm/sec to 200 mm/sec, and the main beam and the plurality of auxiliary beams are generated with the laser output of 5 kW to 8 kW.

17. The welding apparatus according to claim 7, wherein the ratio between the power of the main beam and the total power of the plurality of auxiliary beams is 3:7, the sweep speed of the laser light is 100 mm/sec to 300 mm/sec, and the main beam and the plurality of auxiliary beams are generated with the laser output of 4 kW to 6 kW.

18. The welding apparatus according to claim 7, wherein the ratio between the power of the main beam and the total power of the plurality of auxiliary beams is 1:9, the sweep speed of the laser light is 16.7 mm/sec to 183.3 mm/sec, and the main beam and the plurality of auxiliary beams are generated with the laser output of 6 kW to 12 kW.

* * * * *